(12) United States Patent  (10) Patent No.: US 11,442,727 B2
Agrawal et al.  (45) Date of Patent: Sep. 13, 2022

(54) CONTROLLING PREDICTION FUNCTIONAL BLOCKS USED BY A BRANCH PREDICTOR IN A PROCESSOR

(71) Applicant: Advanced Micro Devices, Inc., Santa Clara, CA (US)

(72) Inventors: Varun Agrawal, Acton, MA (US); John Kalamatianos, Arlington, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 82 days.

(21) Appl. No.: 16/895,825

(22) Filed: Jun. 8, 2020

(65) Prior Publication Data

US 2021/0382718 A1    Dec. 9, 2021

(51) Int. Cl.
*G06F 9/44* (2018.01)
*G06F 9/30* (2018.01)
*G06F 9/38* (2018.01)

(52) U.S. Cl.
CPC ...... *G06F 9/30032* (2013.01); *G06F 9/30058* (2013.01); *G06F 9/3806* (2013.01)

(58) Field of Classification Search
CPC . G06F 9/30032; G06F 9/30058; G06F 9/3806
See application file for complete search history.

(56) References Cited

U.S. PATENT DOCUMENTS

| 7,203,825 | B2* | 4/2007 | Hum | G06F 9/3848 |
| | | | | 712/239 |
| 10,705,848 | B2* | 7/2020 | Vougioukas | G06F 9/3806 |
| 2005/0066154 | A1* | 3/2005 | Chung | G06F 9/3848 |
| | | | | 712/239 |

OTHER PUBLICATIONS

Baniasadi et al., Branch Predictor Prediction: A Power-Aware Branch Predictor for High-Performance Processors, Jan. 2002.
(Continued)

*Primary Examiner* — Cheng Yuan Tseng
(74) *Attorney, Agent, or Firm* — Park, Vaughan, Fleming & Dowler LLP

(57) ABSTRACT

An electronic device includes a processor, a branch predictor in the processor, and a predictor controller in the processor. The branch predictor includes multiple prediction functional blocks, each prediction functional block configured for generating predictions for control transfer instructions (CTIs) in program code based on respective prediction information, the branch predictor configured to select, from among predictions generated by the prediction functional blocks for each CTI, a selected prediction to be used for that CTI. The predictor controller keeps a record of prediction functional blocks from which the branch predictor previously selected predictions for CTIs. The predictor controller uses information from the record for controlling which prediction functional blocks are used by the branch predictor for generating predictions for CTIs.

30 Claims, 12 Drawing Sheets

(56) References Cited

OTHER PUBLICATIONS

Cormode et al., An Improved Data Stream Summary: The Count-Min Sketch and Its Applications, Dec. 2003.
Haj-Yihia et al., Fine-Grain Power Breakdown of Modern Out-of-Order Cores and It Implications on Skylake-Based Systems, Dec. 2016.
Kanter, Slivermont, Intel's Low Power Architecture, May 2013.
Seznec, A 64 Kbytes ISL-TAGE Branch Predictor, Nov. 2011.
Seznec, A 256 Kbits L-TAGE Branch Predictor, Jan. 2005.
Seznec, A New Case for the TAGE Branch Predictor, Nov. 2011.
Seznec, Analysis of the O-Geometric History Length Branch Predictor, Feb. 2005.

* cited by examiner

CONTROLLING PREDICTION FUNCTIONAL BLOCKS USED BY A BRANCH PREDICTOR IN A PROCESSOR

GOVERNMENT RIGHTS

This invention was made with government support under the PathForward Project with Lawrence Livermore National Laboratory (prime contract no. DE-AC52-07NA27344, subcontract no. B620717) awarded by the Department of Energy (DOE). The government has certain rights in this invention.

BACKGROUND

Related Art

Many modern electronic devices include processors (e.g., central processing units, etc.) that execute instructions in program code (e.g., applications, operating systems, etc.) that cause the processor—and thus the electronic device—to perform associated operations. Some of these processors include functional blocks that perform operations for improving the efficiency of executing instructions. For example, processors can include predictors that are used to predict paths or flows of instruction execution (i.e., sequences of addresses in memory from which instructions are to be fetched for execution) based on records of one or more prior instances of executing instructions. One common predictor is a branch predictor, which predicts the resolution of control transfer instructions (CTIs) such as jumps and returns in program code. In operation, as CTIs are executed, branch predictors record the behavior of CTIs, such as the "taken" or "not taken" direction resolutions of CTIs, the target instructions for taken CTIs, etc. Upon again encountering CTIs while executing program code, the branch predictors use the recorded behavior of the CTIs for predicting the resolutions of present executions of the CTIs. Based on the predicted resolutions, the processor speculatively fetches and prepares instructions for execution along a predicted path following the CTI while the CTI itself is prepared and executed. In contrast to processors that wait to determine resolutions of CTIs before proceeding or speculatively follow fixed selections of paths from CTIs, processors with branch predictors can speculatively follow paths from CTIs that are more likely to be the paths that are followed when the CTIs are executed, resulting in lower delays and less recovery operations.

Although branch predictors can help to make the execution of program code more efficient, the branch predictors themselves can be inefficient. For example, in some cases, branch predictors include multiple prediction functional blocks, each of which is used for generating predictions for CTIs based on corresponding prediction information. For example, one such branch predictor is a tagged geometric (TAGE) branch predictor, which includes prediction functional blocks such as a base predictor, one or more tagged predictors, a loop predictor, and a statistical corrector predictor. In branch predictors with multiple prediction functional blocks, each of the prediction functional blocks generates—or at least attempts to generate—a prediction for each CTI. The branch predictor then selects, based on a selection policy, one of the predictions from among the generated predictions to be used as the prediction for that CTI. Because only one prediction is used, the branch predictor ignores/discards all of the other predictions. This means that the computational effort made and electrical power consumed in generating the other predictions goes to waste. Exacerbating this problem is the fact that CTIs can be repeatedly executed (e.g., in program code loops, commonly-used libraries and functions, etc.)—and thus the branch predictor can ignore/discard many generated predictions for the same CTIs.

BRIEF DESCRIPTION OF THE FIGURES

Throughout the figures and the description, like reference numerals refer to the same figure elements.

DETAILED DESCRIPTION

Figure 1:
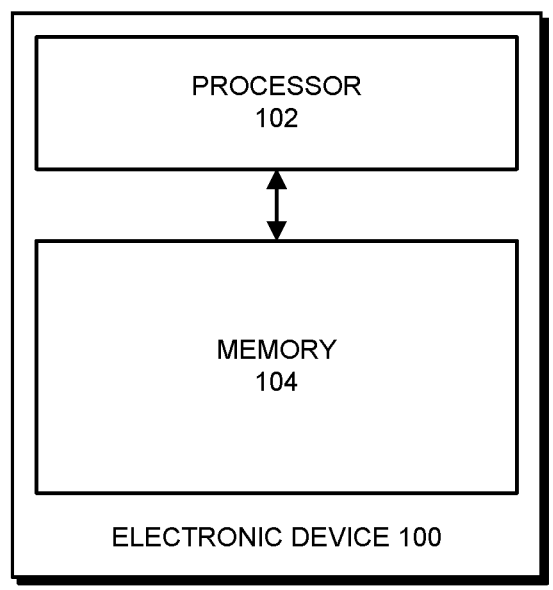
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of these terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational or processing operations, memory operations, etc.), may be controlled by a common control element and/or a common clock, etc. The circuitry of a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Control transfer instruction: a control transfer instruction (CTI) is an instruction in program code that, when executed, causes or can cause a jump, displacement, or discontinuity in an otherwise sequential flow of instruction execution. CTIs include "unconditional" CTIs such as jump, call, return, etc., which automatically cause instruction execution to jump from instructions at first memory addresses, the CTI's, to instructions, or "target instructions," at second memory addresses. CTIs also include "conditional" CTIs such as conditional jump instructions, etc., which include, are associated with, or depend on conditions (e.g., greater than, equal to, non-zero, etc.). When the corresponding condition is satisfied (e.g., true, false, etc.), a conditional CTI causes a jump in instruction execution from the conditional CTI to an instruction at a second memory address. When the condition is not satisfied, however, instruction execution continues sequentially following the conditional CTI. For example, a conditional branch instruction can be implemented using a condition checking instruction and a conditional CTI (or a single combined instruction), with the branch being "taken," and instruction execution jumping to the target instruction, when the condition is met, and the branch instruction being "not taken" or "falling through," and instruction execution continuing sequentially, when the condition is not met. CTIs include "indirect" unconditional and conditional CTIs, for which addresses of target instructions are specified at runtime. For example, an address of a target instruction of an indirect CTI can be computed and stored in a processor register or other location by a prior instruction, and then used to determine the address to which instruction execution is to jump upon executing the indirect CTI (assuming that the indirect CTI, if it is a conditional indirect CTI, is taken).

Prediction window: prediction windows are blocks or sets of instructions that are fetched from one or more memories (e.g., a cache memory, a main memory, etc.) as a group and prepared for execution by a processor. In some embodiments, prediction windows are defined or specified based on CTIs. For example, in some embodiments, a prediction window includes all of the bytes of a cache line (or other block of memory) from a starting byte up to and including the CTI—and may include all of the bytes of the cache line (or other block of memory) when there is no CTI. Depending on prediction window size (e.g., in bytes) and instruction size(s), a prediction window can include multiple instructions. For example, a 64-byte prediction window includes 16 four byte instructions.

Overview

In the described embodiments, an electronic device includes a processor that executes instructions from program code (e.g., a central processing unit, graphics processing unit, etc.). The processor includes a branch prediction unit that generates predictions of resolutions of control transfer instructions (CTIs) in program code based on records of previous resolutions of the CTIs. For example, the branch prediction unit may generate direction predictions (i.e., whether the CTIs will have a "taken" or "not taken" direction when executed by the processor), address predictions, and/or other predictions for CTIs. The predicted resolutions generated by the branch prediction unit are used by the processor for speculatively fetching instructions following the CTIs for execution.

In the described embodiments, the branch prediction unit includes a branch predictor that generates predictions of resolutions for CTIs. The branch predictor includes a number of separate prediction functional blocks, each prediction functional block generating predictions for CTIs based on respective prediction information. For example, in some embodiments, the branch predictor is a tagged geometric (TAGE) branch predictor with prediction functional blocks that include a base predictor and one or more tagged predictors and possibly a loop predictor and/or a statistical corrector. For a TAGE branch predictor, each of the prediction functional blocks makes direction predictions, or alters direction predictions made by other prediction functional block(s), based on prediction information about previous resolutions of CTIs or other properties of instructions in program code kept by that prediction functional block.

In some embodiments, when generating predictions for a given CTI, each of two or more—and possibly all of—the prediction functional blocks in the branch predictor generate predictions for the given CTI. The branch predictor then selects a prediction from among the predictions generated by the prediction functional blocks to be output from the branch predictor. For these operations, the branch predictor first communicates an identifier for the given CTI (e.g., a program counter for a prediction window in which the given CTI is included) to each of the two or more of the prediction functional blocks. Each of the two or more prediction functional blocks then attempts to generate a prediction for the given CTI. The branch predictor next receives the generated predictions from some or all of the two or more prediction functional blocks and selects one of the generated predictions as a prediction to be output from the branch predictor in accordance with a selection policy. The branch predictor therefore selects, in view of the selection policy, a prediction from among predictions generated by the prediction functional blocks to be used for subsequent operations.

In the described embodiments, the processor includes a predictor controller that controls which prediction functional blocks are used by the branch predictor for generating predictions for CTIs. For this operation, the predictor controller keeps a record of prediction functional blocks from which the branch predictor has previously selected generated predictions for CTIs. Upon encountering a given CTI while executing program code, the predictor controller determines, based on information in the record, the prediction functional block(s) that were previously used by the branch predictor for generating direction predictions for the given CTI. The predictor controller next generates, based on the information in the record, a predictor select value that identifies the prediction functional block(s) that were previously used by the branch predictor and communicates the predictor select value to the branch predictor. The branch predictor then uses only the prediction functional block(s) identified in the predictor select value for generating predictions for the given CTI—and selects the prediction to be output from the branch predictor from among the generated predictions. When the record, however, does not include usable information for the given CTI, the prediction functional block generates and communicates a default predictor select value that identifies all (or a particular group of) the prediction functional blocks. In this case, the branch predictor uses all (or the particular group of) the prediction functional blocks for generating predictions for the given CTI. In this way, the predictor controller can limit, when the record includes usable information for CTIs, the prediction functional block(s) that are used by the branch predictor for generating predictions for CTIs to those that prediction functional block(s) that were previously used by the branch predictor.

In some embodiments, the record kept by the predictor controller includes a tag-indexed table. The table includes a set of entries, each entry used for storing tags associated with CTIs and listings of prediction functional blocks from which the branch predictor previously selected predictions for the CTIs associated with the tags. In these embodiments, keeping the record of the prediction functional blocks includes either updating a listing of the prediction functional blocks in an existing entry or adding a new entry for which the listing includes a prediction functional block from which a prediction was selected for a given CTI. On the other hand, when using information from the record of the prediction functional blocks, before the branch predictor makes a branch prediction for a given CTI, when the table includes an existing entry in which is stored a tag that matches a tag associated with the given CTI, the predictor controller acquires, from the existing entry, the listing of the prediction functional blocks. The predictor controller then uses the listing to generate a predictor select value that identifies the prediction functional block(s) that were previously used by the branch predictor and communicates the predictor select value to the branch predictor to be used for generating predictions for the given CTI as described above.

In some embodiments, the entries in the above-described tag-indexed table are also used for storing confidence counters. When adding a new entry to the table for a given CTI, the predictor controller sets the confidence counter in the entry to an initial value. The predictor controller then increases the confidence counter when updating the entry after the branch predictor makes a subsequent prediction for the given CTI and reduces the confidence counter upon determining that the branch predictor made a misprediction for the given CTI. The predictor controller uses the confidence counter for each entry for determining whether the listing of prediction functional blocks in that entry is permitted to be used. When the confidence counter is below a threshold value, the listing of prediction functional blocks in that entry is not permitted to be used. In this case, the predictor controller will not use the listing for setting the predictor select value and/or controlling the prediction functional blocks used by the branch predictor as described above.

In some embodiments, the record kept by the predictor controller includes multiple sub-tables, each sub-table having a number of entries. In these embodiments, the entries in each sub-table are used for storing frequency values and listings of prediction functional blocks from which the branch predictor previously selected predictions for CTIs. The predictor controller accesses each of the sub-tables using a respective different hash function, with each hash function generating, based on identifiers associated with CTIs, indexes into respective locations in the respective sub-table. In these embodiments, for keeping the record of the prediction functional blocks, the predictor controller generates, using the hash function for each sub-table, an index into that sub-table based on an identifier associated with a given CTI. The predictor controller then increases a frequency value and updates the listing of prediction functional blocks for an entry in each sub-table indicated by the respective index. On the other hand, when using information from the record of the prediction functional blocks, before the branch predictor makes a branch prediction for a given CTI, the predictor controller generates, using the hash function for each sub-table, an index into that sub-table based on an identifier associated with a given CTI. The predictor controller then generates a combined listing from a combination of the listing of prediction functional blocks in the entry in each sub-table indicated by the respective index. The predictor controller next uses the combined listing to generate a predictor select value that identifies the prediction functional block(s) that were previously used by the branch predictor and communicates the predictor select value to the branch predictor to be used for generating predictions for the given CTI as described above.

In some embodiments, the predictor controller uses the above-described frequency values in the sub-tables for determining whether the listing of prediction functional blocks in entries in the sub-tables are permitted to be used. Recall that the predictor controller increases frequency values when recording predictions made by the branch predictor in the sub-tables. In addition, upon determining that the branch predictor mispredicted a CTI, the predictor controller reduces the frequency value in respective entries in the sub-tables. For using the frequency values to determine whether listings are permitted to be used, the predictor controller generates, using the hash function for each sub-table, an index into that sub-table based on an identifier associated with a given CTI for which a branch prediction is to be provided by the branch predictor. The predictor controller then determines the frequency value for an entry in each sub-table indicated by the respective index. When all the frequency values are above a threshold value, the predictor controller determines that the listings are useable and uses the listings of the prediction functional blocks in the entries to generate the combined listing as described above. Otherwise, when one or more of the frequency values are at or below the threshold value, the predictor controller determines that the listings are not useable and will not use the listings of the prediction functional blocks in the entries as described above.

As described in more detail above, the described embodiments use a record of the prediction functional block(s) from which the branch predictor previously selected predictions for CTIs to control which prediction functional blocks are used by the branch predictor for generating predictions for CTIs. Because the branch predictor can use the same prediction functional blocks for generating predictions for the same CTI instructions during repeated instances of execution (e.g., as a program code method is executed two or more times, as a loop in program code is executed multiple times, etc.), limiting the prediction functional blocks that are used by the branch predictor as described can help prediction functional blocks from which the prediction will be discarded by the branch predictor avoid performing unnecessary work. Note that, even in the case when a better prediction would have been generated by one of the unused prediction functional blocks, the processor continues correct operation—although possibly needing to handle a misprediction.

By using the record of the prediction functional block(s) from which the branch predictor previously selected predictions for CTIs to control which prediction functional blocks are used by the branch predictor for generating predictions for CTIs, the described embodiments can limit the prediction functional blocks that are used by the branch predictor for generating predictions for CTIs. This can help to avoid unnecessary consumption of electrical power, generation of heat, etc. Reducing electrical power consumption, heat generation, etc. can improve the performance of the processor, which helps to improve the performance of the electronic device. Improved performance of the electronic device results in increased user satisfaction with the electronic device.

Electronic Device

FIG. 1 presents a block diagram illustrating electronic device 100 in accordance with some embodiments. As can be seen in FIG. 1, electronic device 100 includes processor 102 and memory 104. Processor 102 and memory 104 are implemented in "hardware," i.e., using corresponding circuitry. For example, in some embodiments, processor 102 and memory 104 are entirely fabricated in integrated circuitry on one or more semiconductor chips, possibly on one or more separate semiconductor chips, are fashioned from semiconductor chips in combination with discrete circuitry, or are fabricated from discrete circuitry alone. As described herein, processor 102 performs operations for controlling prediction functional blocks used by a branch predictor in processor 102 for generating predictions for CTIs in program code.

Processor 102 is a functional block that performs computational and other operations (e.g., control operations, configuration operations, etc.) in electronic device 100. For example, processor 102 can be or include one or more central processing units (CPUs) or CPU cores, graphics processing units (GPUs) or GPU cores, application specific integrated circuits (ASICs), and/or other processing mechanisms.

Memory 104 is functional block in electronic device 100 that performs operations of a memory (e.g., a "main" memory) for electronic device 100. Memory 104 includes volatile memory circuits such as fourth-generation double data rate synchronous DRAM (DDR4 SDRAM) and/or other types of memory circuits for storing data and instructions for use by functional blocks in electronic device 100 and control circuits for handling accesses of the data and instructions that are stored in the memory circuits and for performing other control or configuration operations.

Electronic device 100 is simplified for illustrative purposes. In some embodiments, however, electronic device 100 includes additional or different functional blocks, subsystems, and/or elements. For example, electronic device 100 may include display subsystems, power subsystems, input-output (I/O) subsystems, communication fabrics, etc. Electronic device 100 generally includes sufficient functional blocks to perform the operations herein described.

Figure 2:
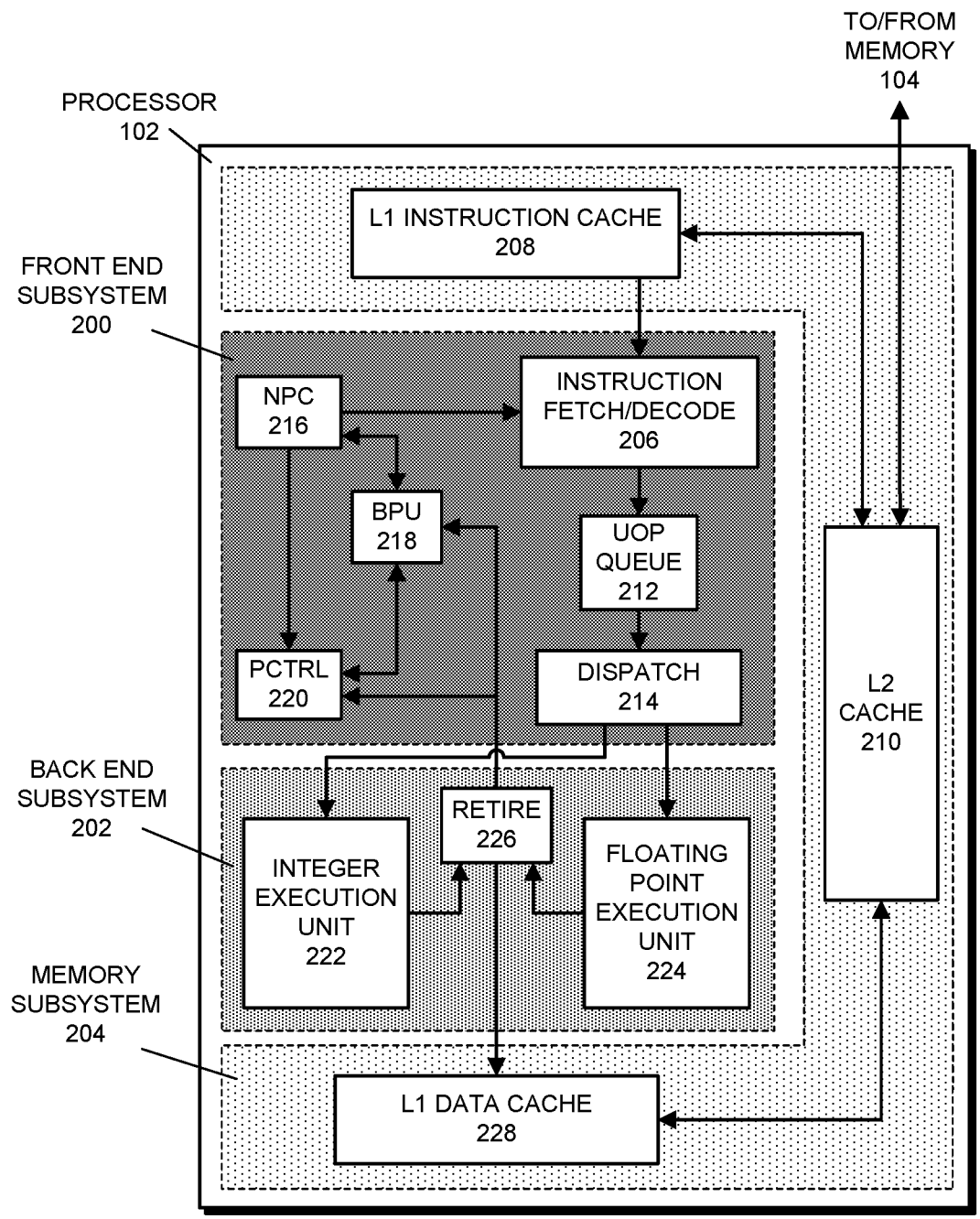
FIG. 2 presents a block diagram illustrating a processor in accordance with some embodiments.

Electronic device 100 can be, or can be included in, any device that performs the operations described herein. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof Processor As described above, electronic device 100 includes processor 102. FIG. 2 presents a block diagram illustrating processor 102 in accordance with some embodiments. As shown in FIG. 2, functional blocks in processor 102 can be considered as part of front end subsystem 200, back end subsystem 202, or memory subsystem 204. Generally, front end subsystem 200 includes functional blocks that perform operations for acquiring instructions from memory subsystem 204 and generating micro-operations from the instructions that are sent to execution units in back end subsystem 202 for execution. Front end subsystem 200, back end subsystem 202, and memory subsystem 204 (and the functional blocks included therein) are implemented in "hardware," i.e., using corresponding circuitry. For example, in some embodiments, front end subsystem 200, back end subsystem 202, and memory subsystem 204 are entirely fabricated in integrated circuitry on one or more semiconductor chips, possibly on one or more separate semiconductor chips, are fashioned from semiconductor chips in combination with discrete circuitry, or are fabricated from discrete circuitry alone.

Front end subsystem 200 includes instruction fetch/decode 206, which is a functional block that includes circuitry that performs operations associated with fetching instructions and decoding fetched instructions into micro-operations in preparation for executing the micro-operations. Instruction fetch/decode 206 fetches (i.e., requests and receives) instructions in prediction windows from L1 instruction cache 208—or L2 cache 210 or memory 104, if necessary. Instruction fetch/decode 206 then decodes instructions in the fetched prediction windows into respective micro-operations. Instruction fetch/decode 206 forwards the micro-operations to micro-operation (UOP) queue 212, which is a functional block that includes circuitry for controlling when and how micro-operations are fed from front end subsystem 200 to back end subsystem 202. From micro-operation queue 212, micro-operations are eventually fed to dispatch 214, which is a functional block that includes circuitry for steering or directing micro-operations to appropriate execution units in back end subsystem 202 for execution.

Front end subsystem 200 also includes next PC (NPC) 216, which is a functional block that includes circuitry that performs operations for determining an address in memory, or a "program counter," for a next prediction window to be fetched from L1 instruction cache 208 for execution. Next PC 216, based on an initial or current value of the program counter, computes a next sequential value for the program counter. For example, given two successive 32-byte prediction windows, next PC 216 may compute next address=current address+32 bytes. When program/instruction flow is not altered by CTIs, front end subsystem 200 uses the sequential values of the program counter that are computed by next PC 216 for fetching prediction windows from corresponding sequential addresses in memory.

Front end subsystem 200 additionally includes branch prediction unit (BPU) 218, which is a functional block that includes circuitry that performs operations for predicting resolutions of CTIs in prediction windows. Branch prediction unit 218 uses one or more records of prior CTI resolution or behavior to predict resolutions of CTIs. For example, in some embodiments, branch prediction unit 218 predicts direction resolutions for CTIs, e.g., taken or not taken resolutions and, for indirect CTIs, target addresses, and/or makes other predictions for CTIs. Based on the predictions, branch prediction unit 218 can modify the program counter—and thus the address in memory—from which subsequent prediction windows are fetched and/or can otherwise handle executing CTIs in program code. For example, when a CTI is predicted taken by branch prediction unit 218, branch prediction unit 218 may replace a next or subsequent program counter provided by next PC 216 with a—possibly predicted—target address for the CTI.

In the described embodiments, branch prediction unit 218 includes a branch predictor functional block that has circuitry that generates predictions for CTIs (i.e., direction predictions, target address predictions, and/or other predictions). The circuitry in the branch predictor includes a number of separate prediction functional blocks, each prediction functional block including circuitry for generating predictions for CTIs based on corresponding prediction information. For example, in some embodiments, the branch predictor includes a tagged geometric (TAGE) branch predictor (e.g., a TAGE-SC-L branch predictor or another TAGE branch predictor) with multiple prediction functional blocks. As another example, in some embodiments, the branch predictor includes an optimized geometric history length (O-GEHL) branch predictor with multiple prediction functional blocks. Generally, in the described embodiments, branch prediction unit 218 can include any form of branch predictor having two or more prediction functional blocks that generate predictions for CTIs based on corresponding prediction information.

The "corresponding prediction information" used by each of the prediction functional blocks for generating predictions depends on the nature of predictions provided by the prediction functional blocks. For example, the corresponding prediction information can include information such as records, lists, tables, etc. of or including direction resolutions for one or more CTIs and/or sequences of CTIs, address resolutions for one or more CTIs and/or sequences of CTIs, loop properties for CTIs in program code loops, misprediction rates for CTIs, relationships or correlations between two or more CTIs, general CTI tendencies or properties, etc.

In the described embodiments, for at least some CTIs, the branch predictor generates predictions using two or more—and possibly all—of the prediction functional blocks. The branch predictor then selects a single prediction from among the predictions generated by the two or more prediction functional blocks to be output from the branch predictor as the prediction for each CTI. For these operations, when generating a prediction for a given CTI, the branch predictor first communicates an identifier for the given CTI to each of the two or more of the prediction functional blocks. For example, in some embodiments, the branch predictor communicates, to the prediction functional blocks, a program counter or address for a prediction window in which the given CTI is included as the identifier for the given CTI. Each of the two or more prediction functional blocks then attempts to generate a prediction for the given CTI. (Although some or all of the two or more prediction functional blocks may be unable to generate predictions due to lack of information about the given CTI, etc., for this example, it is assumed that all of the two or more prediction functional blocks generate a prediction for the given CTI.) The branch predictor next receives the generated predictions from the two or more prediction functional blocks and selects one of the predictions as a prediction to be output from the branch predictor in accordance with a selection policy. For example, the branch predictor may use a selection policy such as an ordered list of the prediction functional blocks to select the prediction to be output from the branch predictor. The branch predictor therefore selects, in view of the selection policy, a "most desirable" prediction to be used for subsequent operations from among predictions generated by the prediction functional blocks.

Figure 3:
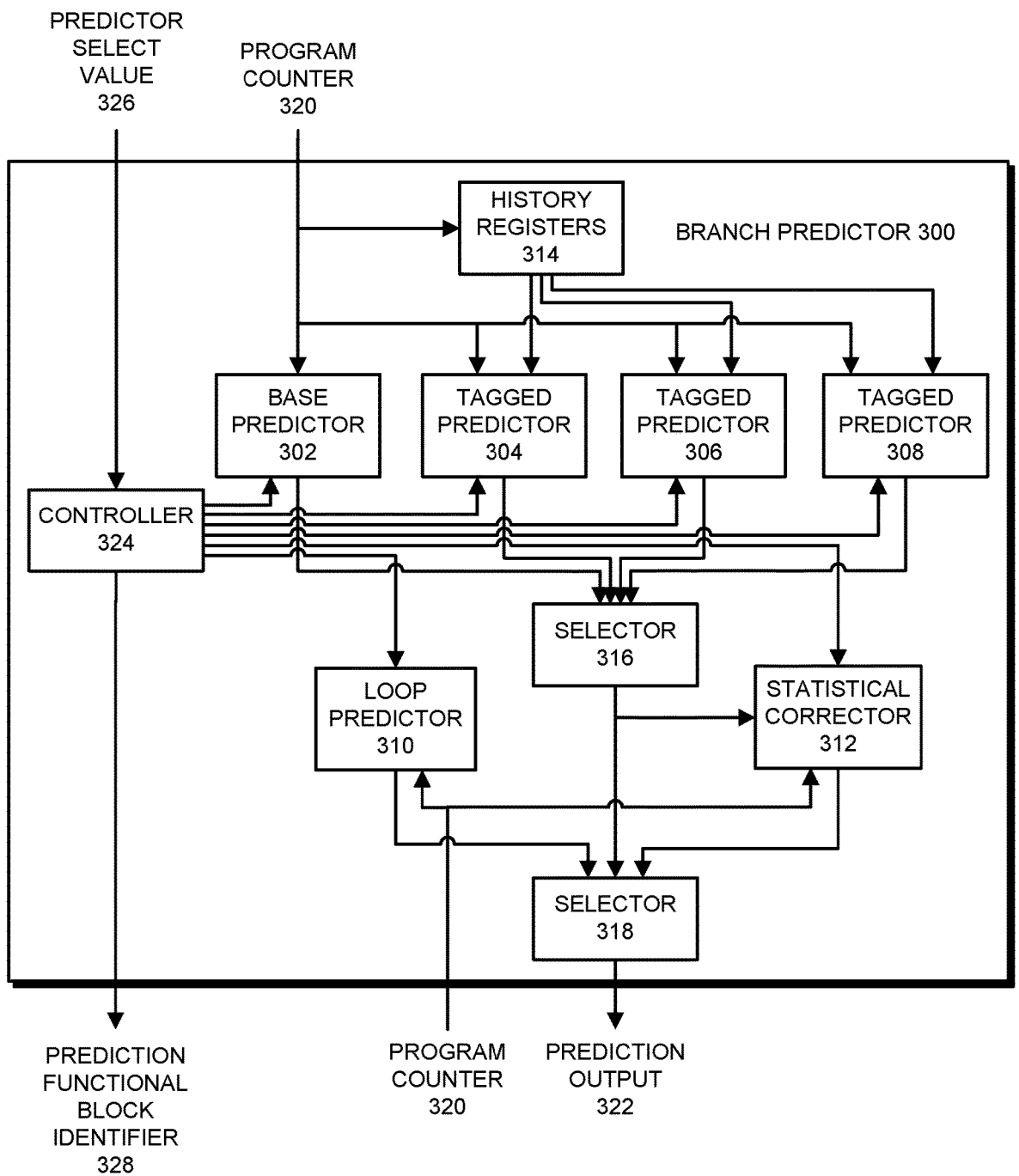
FIG. 3 presents a block diagram illustrating a branch predictor in accordance with some embodiments.

As an example of the above-described branch predictor, FIG. 3 presents a block diagram illustrating a TAGE branch predictor 300 in accordance with some embodiments. As can be seen in FIG. 3, branch predictor 300 includes a number of prediction functional blocks, including base predictor 302, tagged predictors 304-308, loop predictor 310, and statistical corrector 312, each of which can be used for generating direction predictions for CTIs. Base predictor 302 is a prediction functional block that provides default direction predictions for CTIs in prediction windows. Direction predictions provided by base predictor 302 can be used as "default" predictions when tagged predictors 304-308 do not make a direction prediction on their own (e.g., due to lack of information about CTIs, etc.). In other words, in some embodiments, branch predictor 300 can preferentially use direction predictions provided by tagged predictors 304-308, but can fall back to using direction predictions provided by base predictor 302 when tagged predictors 304-308 do not provide direction predictions. Base Predictor 302 uses a simplified indexing scheme. For example, in some embodiments, base predictor 302 is a program counter indexed 2-bit counter table. Base predictor 302 therefore includes a number of entries used for storing records associated with CTIs in prediction windows, each record including a program-counter based index and a 2-bit saturating counter in which is stored a direction history for the CTI identified by the index. In some embodiments, the program counters by which base predictor is indexed are the program counters associated with prediction windows in which CTIs are included. In addition, in some embodiments, the "corresponding prediction information" (as the term is used elsewhere in this description) used by base predictor 302 is the 2-bit counters.

Tagged predictors 304-308 are prediction functional blocks that each provide direction predictions using a tag-based indexing scheme. For example, in some embodiments, each of tagged predictors 304-308 is a history-length-based tag indexed N-bit counter table (where N is $3$, $5$, or another value—and may be different for each of tagged predictor 304-308). Each of tagged predictors 304-308 therefore includes a number of entries used for storing records associated with CTIs in prediction windows, each record including a tag-based index and an N-bit saturating counter in which is stored a direction history for the CTI identified by the index. The tags for each of tagged predictors 304-308 are generated using different lengths of CTI direction resolution history, or "history lengths." As used herein, a "history" is a record of CTI direction resolutions for a number of prior instances of execution of the CTI and "length" is the number of prior instances. For example, a history length may be 50, 100, or another number of prior instances of CTI resolution, such as a sequence of bits indicating the taken or not-taken direction resolution for the prior instances. Each of tagged predictors 304-308 is indexed using values, or "tags," that are generated as a logical or bitwise combination of CTI histories of the respective length and identifiers for CTIs such as program counters for prediction windows in which the CTIs are included. In some embodiments, the individual history lengths for tagged predictors 304-308, when considered as a series, form a geometric series (e.g., length(i)=

(int)($\alpha^{i-1}$*L(1)+0.5)) or another series or sequence of values. In addition, in some embodiments, the "corresponding prediction information" (as the term is used elsewhere in this description) used by each of tagged predictors 304-308 is the respective N-bit counters.

Loop predictor 310 is a prediction functional block that provides direction predictions for CTIs in loops in program code (or, more generally, repeating sections of program code for which the repetitions are controlled by CTIs). Loop predictor 310, which is indexed using program counters for prediction windows in which CTIs are included, includes a number of records of loops in program code, each record identifying loop lengths or numbers of iterations. Loop predictor 310 tracks instances of CTIs in loops (e.g., loop termination CTIs, etc.) and provides direction predictions for CTIs at the termination of loops. In some embodiments, loop predictor 310 overrides or replaces direction predictions made by base predictor 302 and/or tagged predictors 304-308 so that branch predictor 300 ignores direction predictions from base predictor 302 and/or tagged predictors 304-308 in cases where loop predictor 310 provides a direction prediction. In some embodiments, the "corresponding prediction information" (as the term is used elsewhere in this description) used by loop predictor 310 is the records of loops in program code.

Statistical corrector 312 is a prediction functional block that provides direction predictions for CTIs that are less correlated with CTI direction histories. Generally, the direction predictions provided by base predictor 302 and tagged predictors 304-308 can be incorrect more often when predicting statistically biased branches, e.g., CTIs that have only a small bias towards a direction, but are not strongly correlated with a CTI direction resolution history. Statistical corrector 312 therefore, for providing direction predictions for CTIs for which the direction resolution is statistically biased, uses records of such CTIs for detecting the relatively unlikely direction predictions and to replacing/inverting the direction predictions made by base predictor 302 and tagged predictors 304-308. Statistical corrector 312 receives direction predictions from some or all of base predictor 302 and tagged predictors 304-308 and information about CTIs (e.g., a program counter for the prediction window in which the CTI is included, a global direction resolution history for CTIs, a path in program code up to the CTI, a local direction resolution history CTIs, etc) and determines whether to replace/invert the direction prediction received from base predictor 302 and/or tagged predictors 304-308. In some embodiments, the "corresponding prediction information" (as the term is used elsewhere in this description) used by statistical corrector 312 is the records of the statistically biased CTI resolutions.

In addition to the prediction functional blocks, branch predictor 300 includes a history registers 314 functional block, which includes circuitry for storing records of CTI direction resolution histories that are used for generating indexes for tagged predictors 304-308. For example, history registers 314 can store branch direction resolution histories in the form of bit sequences or vectors of 0s and 1s of specified lengths.

Branch predictor 300 also includes selectors 316-318, which are functional blocks that include circuitry for selecting, from among direction predictions generated by, in the case of selector 316, base predictor 302 and tagged predictors 304-308, and in the case of selector 318, loop predictor 310 and statistical corrector 312, as well as direction predictions output from selector 316. In other words, selector 316 forwards a direction prediction that is selected from among direction predictions received from some or all of base predictor 302 and tagged predictors 304-308 (recalling that some or all of base predictor 302 and tagged predictors 304-308 may not generate direction predictions for particular CTIs due to lack of information or lack of usable information about the particular CTIs, etc.). For example, circuitry in selector 316 may be configured to preferentially select direction predictions output from, in order, tagged predictor 308, tagged predictor 306, tagged predictor 304, and base predictor 302. This can be regarded as selector 316 using a "selection policy," as implemented in the circuitry, for selecting a particular direction prediction to be forwarded. The direction prediction output from selector 316 is fed to selector 318 along with direction predictions from loop predictor 310 and statistical corrector 312 (recall that loop predictor 310 and statistical corrector 312 may not generate direction predictions for particular CTIs due to lack of information or lack of usable information about the particular CTIs, etc.). Selector 318 then selects, from among the direction predictions received from some or all of selector 316, loop predictor 310, and statistical corrector 312, a direction prediction to be output as prediction output 322 from branch predictor 300. Similarly to selector 316, selector 318 includes circuitry for selecting from among input direction predictions in a given order—which amounts to selector 318 selecting a direction prediction to be output in accordance with the selection policy. In this way, selectors 316 and 318 select, in view of the selection policy, from among predictions generated by the prediction functional blocks to be used for subsequent operations.

Branch predictor 300 further includes controller 324, which is a functional block that includes circuitry for controlling which prediction functional blocks from among base predictor 302, tagged predictors 304-308, loop predictor 310, and statistical corrector 312 are used for generating direction predictions for CTIs. For this operation, for a given CTI, controller 324 receives, from predictor controller (PC-TRL) 220, predictor select value 326, which is a value that identifies the prediction functional block(s) that were previously used by branch predictor 300 for generating direction predictions for the given CTI. Controller 324 then uses only the prediction functional blocks that are identified in predictor select value 326 to generate direction predictions. Controller 324 may, for example, assert disabling signals, control clock gating circuitry, etc. in order to disable or otherwise prevent prediction functional blocks that are not identified in the predictor select value 326 from generating direction predictions. Prediction functional blocks that are disabled by controller 324 do not output direction predictions for the given CTI, which means that selector 316 and 318 are only able to select from any direction predictions output from other/not disabled prediction functional blocks. In some embodiments, when disabled or prevented from generating predictions, a prediction functional block is placed in a lower-power operating state (via clock gating, reduced voltages, etc.) and thus conserves electrical power.

Controller 324 also receives, from selector 318 or elsewhere in branch predictor 300, an identifier for the prediction functional block from which selector 318 selects a direction prediction to be output as prediction output 322 for each CTI. Controller 324 then outputs, based on the identifier for the prediction functional block, prediction functional block identifier 328 to predictor controller 220 to enable predictor controller 220 to update a record of prediction functional blocks from which direction predictions have been selected for that CTI. For example, prediction functional block identifier 328 may be or include a bit vector with a particular bit set to identify the CTI, a numerical identifier for the CTI, a string value that identifies the CTI, etc.

Although branch predictor 300 is used as an example, in some embodiments, the branch predictor includes different numbers and/or types of prediction functional blocks. Generally, in the described embodiments, the branch predictor includes sufficient prediction functional blocks to perform the operations described herein. In addition, although program counter 320 is shown in two separate locations in FIG. 3, program counter 320 is the same signal and/or includes the same information. Program counter 320 is shown in this way for clarity.

Returning to FIG. 2, front end subsystem 200 further includes predictor controller (PCTRL) 220, which is a functional block that includes circuitry that performs operations for controlling the prediction functional blocks used by branch predictor 300 in branch prediction unit 218 for predicting resolutions for CTIs. Predictor controller 220 keeps a record of prediction functional blocks from which branch predictor previously selected predictions for CTIs. Predictor controller 220 uses information from the record for controlling which prediction functional blocks are used by the branch predictor for generating predictions for CTIs. The functional blocks in and operations performed by predictor controller 220 are described in more detail below.

Back end subsystem 202 includes integer execution unit 222 and floating point execution unit 224, which are functional blocks that include circuitry that perform operations for executing integer and floating point micro-operations, respectively. Integer execution unit 222 and floating point execution unit 224 include elements such as renaming hardware, execution schedulers, arithmetic logic units (ALUs), floating point multiply and add units (in floating point execution unit 224), reordering hardware, register files, etc. that are used for executing micro-operations or performing other operations. Micro-operations are steered or directed from dispatch 214 to integer execution unit 222 or floating point execution unit 224 based on the data types of the micro-operations, the execution unit resources to be used for executing the micro-operations, etc.

Back end subsystem 202 also includes retire unit 226, which is a functional block in which the results of executed instructions are held after the corresponding instructions have completed execution, but prior to the results being committed to an architectural state of processor 102 (e.g., written to a L1 data cache, L2 cache 210, and/or memory 104 and made available for use in other operations). In some embodiments, certain instructions can be executed out of program order and retire unit 226 is used in ensuring that results of out-of-order executed instructions are committed in order to the architectural state of the processor properly with respect to results of other out-of-order instructions. In addition, in some embodiments, retire unit 226 monitors the actual/computed resolution of CTIs and informs other functional blocks in the processor, e.g., branch prediction unit 218, predictor controller 220, etc., when a CTI was mispredicted. Upon being informed by retire unit 226 that a CTI was mispredicted, the other functional blocks in the processor can perform operations such as misprediction recovery (e.g., flushing instructions and/or results from instructions speculatively fetched and executed following a mispredicted CTI and restarting fetching/executing instructions following the mispredicted CTI), updating the record in predictor controller 220, etc.

Memory subsystem 204 includes a hierarchy of cache memories, which are functional blocks that include circuitry that performs operations for storing copies of instructions and/or data nearer the functional blocks that use the instructions and/or data (than memory 104), as well as control circuits for handling accesses of the instructions and/or data. The hierarchy includes two levels, with level one (L1) instruction cache 208 and L1 data cache 228 on the first level and L2 cache 210 on the second level. Memory subsystem 204 is communicatively coupled to memory 104 and may also be coupled to an external L3 cache (not shown).

Although a particular arrangement, connectivity, and number of elements is shown in processor 102 in FIG. 2, in some embodiments, different arrangements, connectivity, and/or numbers of elements are present in processor 102. Generally, processor 102 includes sufficient elements to perform the operations described herein. In addition, although shown as a single group in FIG. 2, in some embodiments, some or all of the functional blocks in processor 102 are fabricated separately, such as on separate integrated circuit chips.

Predictor Controller

Figure 4:
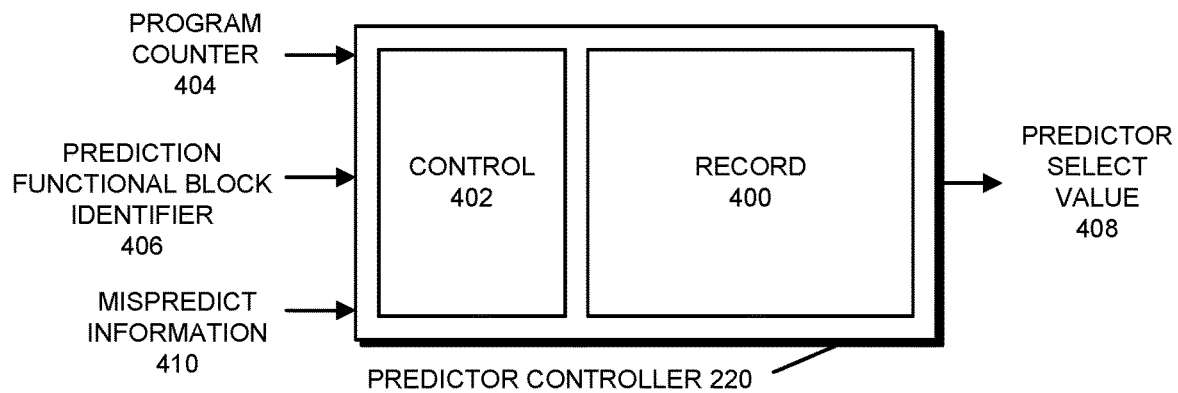
FIG. 4 presents a block diagram illustrating a predictor controller in accordance with some embodiments.

In the described embodiments, predictor controller 220 performs operations for controlling the prediction functional blocks used by a branch predictor (e.g., branch predictor 300) for making predictions for CTIs in program code. FIG. 4 presents a block diagram illustrating predictor controller 220 in accordance with some embodiments. As can be seen in FIG. 4, predictor controller 220 includes record 400, which is a functional block that includes circuitry for storing records of prediction functional blocks from which the branch predictor previously selected predictions for CTIs. In other words, record 400 is used for storing information that identifies, for CTIs, the prediction functional blocks (e.g., base predictor 302, tagged predictors 304-308, etc.) from which the branch predictor previously selected (e.g., via selectors 316 and 318) and output the prediction (e.g., as prediction output 322). For example, assume an embodiment where the branch predictor includes four prediction functional blocks, numbered 1, 2, 3, and 4 for this example, and that the branch predictor has selected predictions from the prediction functional blocks for a given CTI in the sequence 1, 1, 3, 3, and 1 during five previous instances of execution of the given CTI. In this case, record 400 will include information that identifies prediction functional blocks 1 and 3 as having had their predictions selected by the branch predictor for the given CTI (but not prediction functional blocks 2 and 4).

Predictor controller 220 also includes control 402, which is a functional block that includes circuitry for controlling the operations of predictor controller 220. Included in the operations performed by control 402 are operations for maintaining and using the information in record 400. As a part of the operations for maintaining the information in record 400, control 402 adds and updates information for CTIs in record 400. For these operations, in some embodiments, control 402 receives program counter 404 (e.g., from next PC 216 or another functional block) and prediction functional block identifier 406 (e.g., from controller 324). Control 402 then adds new information to record 400 about a prediction functional block from which a prediction was selected by the branch predictor for the CTI identified by program counter 404—or updates existing information in record 400 about the CTI. As another part of the operations for maintaining the information in record 400, control 402 updates information for CTIs in record 400 based on mispredict information 410. For this operation, in some embodiments, control 402 receives (e.g., from retire unit 226) mispredict information 410, that identifies a CTI (e.g., a program counter, etc.) for which an earlier prediction was incorrect as determined by the retire unit based on the execution of the CTI. Control 402 then updates existing information in record 400 about the CTI to reflect the misprediction (assuming that such information exists in record 400).

In some embodiments, as part of the above-described operations for using the information in record 400, control 402 performs lookups in record 400 using program counter 404 (or values computed therefrom) to determine prediction functional blocks from which the branch predictor previously selected predictions for CTIs. Control 402 then generates predictor select values 408 that identify the prediction functional blocks from which the branch predictor previously selected predictions for CTIs. Control 402 next communicates the predictor select values 408 to the branch predictor, which uses the predictor select values 408 to control which predictor functional blocks are used for generating predictions for CTIs. Note that, when record 400 does not include information about prediction functional blocks from which the branch predictor previously selected predictions for CTIs, control 402 can generate and communicate a default predictor select value 408 to the branch predictor. For example, in this case, control 402 can generate a predictor select value 408 that indicates that all of (or a specified group of) the prediction functional blocks should be used for generating predictions.

Program counter 404 is or includes some or all of a memory address or other reference associated with the CTI—and may not include the actual memory address for the CTI. For example, in some embodiments, program counter 404 is a memory address for a prediction window in which the CTI is included. For instance, in some embodiments, program counter 404 is the memory address of a first instruction in the prediction window—i.e., an address used by instruction fetch/decode 206 for fetching the prediction window from L1 instruction cache 208 (or L2 cache 210 or memory 104). In some embodiments, however, program counter 404 is a different value. Generally, in the described embodiments, predictor controller 220 receives as (or in place of) "program counter 404" an identifier for, or associated with, CTIs that can be used to identify CTIs for the purposes of maintaining and using the information in record 400.

In some embodiments, the same program counter 404 is used by control 402 at the commencement of branch prediction for determining predictor select value 408 (i.e., for informing the branch predictor which prediction functional blocks are to be used for generating predictions) and at the conclusion of branch prediction for updating the record based on prediction functional block identifier 406 for the given CTI. In other words, in these embodiments, program counter 404 is communicated to predictor controller 220, used to generate the predictor select value 408, and then maintained or stored in predictor controller 220 until the branch predictor reports prediction functional block identifier 406, at which point program counter 404 is used for updating record 400.

Tag Indexed Record

In some embodiments, record 400 is a tag indexed record in which tags generated from identifiers associated with CTIs (e.g., program counter 404, etc.) are used for indexing, and thus maintaining and using the information in, record 400. Generally, the tags used to index record 400 in these embodiments are values that are generated from, based on, or using the identifiers associated with the CTIs. For example, in some embodiments, the tags are N-bit (where N=8, 24, or another value) values that are generated based on K-bit (where K=32, 64, or another value) program counters associated with CTIs. For "indexing" the record, the tags are used by control 402 to find, identify, add/update, or otherwise interact with information in the record for corresponding CTIs.

Figure 5:
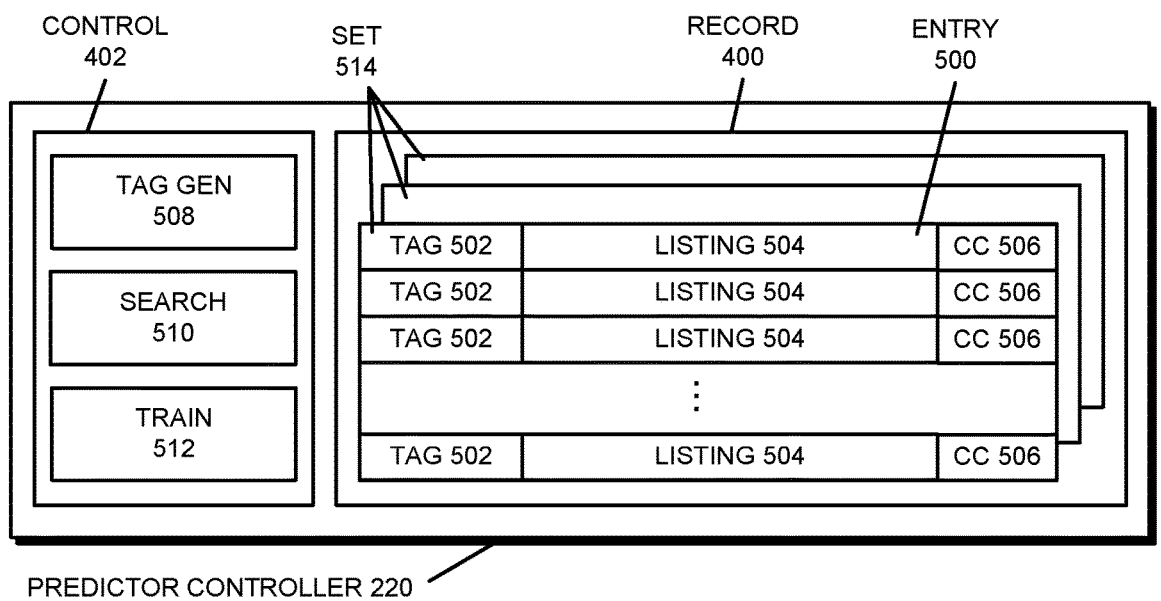
FIG. 5 presents a block diagram illustrating a tag-indexed record in accordance with some embodiments.

FIG. 5 presents a block diagram illustrating a tag indexed record 400 in accordance with some embodiments. As can be seen in FIG. 5, record 400 includes a number of entries 500 (only one of which is labeled for clarity), each entry usable for storing a tag 502, a listing 504, and a confidence counter (CC) 506. Tags 502 are values (e.g., sequences of bits, strings, numerical values, etc.) that identify CTIs for the purpose of maintaining and using the information in entries 500 in record 400. Listings 504 are values (e.g., sequences of bits, strings, numerical values, etc.) that indicate the prediction functional blocks from which a branch predictor (e.g., branch predictor 300) previously selected predictions for the CTIs identified in tags 502. For example, in some embodiments, each listing 504 includes a sequence of bits with a single bit to be used for storing an indicator for each available prediction functional block in the branch predictor. In these embodiments, if there are five prediction functional blocks in the branch predictor, there are five bits in each listing 504, with each bit used for indicating a specified one of the prediction functional blocks. Confidence counters 506 are values (e.g., numerical values, etc.) in which is kept a count that represents a number of predictions made for a CTI identified by tag 502 in each entry. For example, in some embodiments, each confidence counter is an M-bit saturating counter (where M=3, 6, or another value). Confidence counters 506 are used for determining whether information in an entry 500 in record 400 is usable/permitted to be used for controlling the prediction functional blocks used by the branch predictor. In some embodiments, when the confidence counter 506 for an entry 500 is below a threshold value, the information in that entry (i.e., listing 504) is not permitted to be used.

Control 402 in FIG. 5 includes tag generator (GEN) 508, which is a functional block that includes circuitry for generating tags from identifiers associated with CTIs. For example, in some embodiments, tag generator 508 includes a number of logic gates (e.g., XOR gates, AND gates, etc.) that receive identifiers for CTIs as inputs and output corresponding tags. As another example, in some embodiments, tag generator 508 includes circuitry for implementing a particular hash function, with input of the hash function being the identifiers associated with the CTIs and the output of the hash function being the tags. In some embodiments, the tags generated by tag generator 508 are not exclusive—and thus collisions may occur (i.e., the same tags may be generated based on the identifiers for two or more CTIs). For example, in some embodiments, tag generator 508 generates X-bit tags (where X=8, 12, or another value) from W-bit (where W=32, 64, or another value) program counters associated with CTIs—and the collisions occur because multiple W-bit program counters lead to the same X-bit tags. Although this is true, there is no functional issue with the use of the tags or the predictor select values generated therefrom, as processor 102 can recover from mispredictions caused by the use of incorrect predictor select values caused by tag collisions.

Control 402 in FIG. 5 also includes search 510, which is a functional block that includes circuitry for searching entries 500 in record 400 for information for CTIs. For example, in some embodiments, search 510 includes searching circuitry such as content addressable memory (CAM) or other search or lookup mechanisms that receive, as inputs, tags generated by tag generator 508 (or another functional block). The searching circuitry then compares the tags to some or all of the tags in record 400 to determine if entries that have matching existing tags are present. The searching circuitry returns miss indicators if no matching entries are found or identifiers for the particular entries when matching entries are found. In some embodiments, the searching circuitry checks the confidence counter for each matching entry and will not return an identifier for an entry when the confidence counter is below a threshold value—i.e., will behave as if a miss was encountered when the information in a matching entry is not useable.

Control 402 in FIG. 5 additionally includes train 512, which is a functional block that includes circuitry for training record 400. For "training" record 400, train 512 performs operations for maintaining information in entries 500. In other words, train 512 performs operations for keeping information in entries 500 substantially updated and current during operation of processor 102. For example, in some embodiments, train 512 receives, from tag generator 508, a tag associated with a CTI, from search 510, a miss indicator or an identifier for the particular entry, and, from controller 324, a prediction functional block identifier 406. Train 512 then either adds a new tag 502, listing 504, and confidence counter 506 to an available entry 500 in record 400 or updates a listing 504 for an existing entry 500 in record 400. When adding or updating a listing 504, train 512 modifies the listing to include an indicator that the branch predictor selected a prediction from the prediction functional block identified in prediction functional block identifier 406. For example, in an embodiment where each listing 504 includes a sequence of bits having a single bit for each prediction functional block, train 512 can switch a bit for a given prediction functional block from 0 to 1 to indicate that the prediction was selected from that prediction functional block. Note, however, that train 512 leaves the listing unchanged in the event that the indicator for a given prediction functional block is already set.

In some embodiments, upon the occurrence of one or more reset events, train 512 resets or clears some or all of the entries 500 in record 400, thereby removing information about a CTI from each reset or cleared entry 500. For example, in some embodiments, train 512 resets all of the entries periodically (e.g., every X seconds, at a hardware and/or software context switch, etc.). As another example, in some embodiments, train 512 keeps track of the ages of the entries 500, i.e., a time since a last update, and resets each entry 500 when that entry 500 exceeds a given age. Generally, in these embodiments, train 512 performs operations for removing, from entries 500, information about CTIs that is determined to be stale—and thus less likely to be correct.

As can be seen in FIG. 5, record 400 includes multiple sets 514 of entries. FIG. 5 is shown in this way to illustrate that, in some embodiments, record 400, and thus the entries 500 therein, is organized as associative. For example, record 400 may be organized as set associative, and thus entries 500 in record 400 are logically divided into a number of sets and a number of ways per set. In these embodiment, search 510 finds entries 500 based on the tag for the CTI and the particular set used for record 400. When information for a given CTI is to be added to record 400, if search 510 is unable to find an empty/unused entry, search 510 finds an entry to be replaced. Train 512 can then overwrite information for another CTI in that entry. In some embodiments, the predictor controller determines an existing entry to be overwritten based on a policy such as least recently used, least frequently used, or another policy. Although record 400 is shown with three sets 514, in some embodiments, a different number of sets is used. Generally, in the described embodiments, record 400 includes sufficient sets to perform the operations herein described.

In some embodiments, some or all of entries 500 include respective circular buffers with multiple buffer elements. In these embodiments, each buffer element includes circuitry for storing a single listing of a prediction functional block that generated a prediction that was previously used by the branch predictor for a CTI associated with the tag for that entry. For example, assume an embodiment where the branch predictor includes six prediction functional blocks, numbered 1, 2, 3, 4, 5, and 6 for this example, that the branch predictor has selected predictions from the prediction functional blocks for a given CTI in the sequence 1, 4, 4, 6, and 6 during five previous instances of execution of the given CTI, and that the circular buffer in each entry includes five buffer elements, each buffer element storing a six-bit listing. In this case, the buffer elements in the entry 500 for the given CTI in record 400 will include the following listings: 100000, 000100, 000100, 000001, and 000001. In these embodiments, the buffer is "circular" in that, when the buffer fills up, the predictor controller will overwrite existing information with new information in a circular pattern as needed—thereby replacing old listings with newer listings. In some of these embodiments, when using the listings from the circular buffer in a given entry 500, predictor controller 220 can generate a combined listing that includes all of the prediction functional blocks from which the branch predictor selected predictions. Continuing the example above, combining the five listings results in a combined listing of: 100101 (which indicates that the branch predictor selected predictions from the 1, 4, and 6 prediction functional blocks). In these embodiments, because older listings in the circular buffer can be overwritten by newer listings, using the circular buffer enables predictor controller 220 to perform the operations herein described based on more recent listings.

Although predictor controller 220, control 402, and record 400 are described as including particular functional blocks and elements, and the functional blocks and elements are described as performing respective operations, in some embodiments, different functional blocks and/or elements are present in some or all of predictor controller 220, control 402, and/or record 400 and/or the functional blocks and/or elements perform different operations. Generally, in the described embodiments, predictor controller 220, control 402, and record 400 include sufficient functional blocks and elements to perform the operations herein described.

Sub-Table Record

In some embodiments, record 400 includes a number of sub-tables that are used for keeping track of CTIs for which the branch predictor has previously generated prediction(s). Generally, in these embodiments, the sub-tables are used for keeping counts of CTIs for which the branch predictor previously provided predictions. The counts are kept in the sub-tables using a technique similar to Count-Min Sketch algorithms and other item/element counting algorithms used for keeping track of items that have been encountered in a sequence of items. In these embodiments, the sub-tables are indexed using index values generated using respective hash functions from identifiers associated with CTIs (e.g., program counter 404). The identifier associated with each CTI will index, via the respective hash function, into one entry in each of the sub-tables (although not necessarily the same entry in each sub-table). The sub-tables are used for keeping track of CTIs for which the branch prediction has provided a prediction by keeping a count or "frequency value" in each entry that indicates the number of times CTIs have indexed into that entry. In other words, when the branch predictor provides a prediction for a given CTI, an identifier for the given CTI is used to generate indices into each sub-table and a frequency value for an entry indicated by each of the indices is increased. When the particular entries indexed into by the given CTI are all non-zero, therefore, the predictor controller can determine that the branch predictor has previously provided a prediction for the given CTI.

In some embodiments, due to the nature of the hash functions used for indexing into the sub-tables, collisions can occur between indexes generated for different CTIs. For example, in some embodiments, the hash functions generate A-bit indices (where A=6, 15, or another value) from K-bit (where K=32, 64, or another value) program counters associated with CTIs—and the collisions occur because multiple K-bit program counters lead to the same A-bit indices. In other words, the same entry(ies) in one or more of the sub-tables may be indexed into for multiple CTIs. The frequency values in the entries in the sub-tables can therefore be increased based on multiple (and possibly many) CTIs having indexed into that entry. It is possible, given the frequency values in the sub-tables, that the branch predictor appears to have provided a prediction for a given CTI when that CTI has not yet been encountered. This is called a false positive. False positives may result in inefficient operation, but there is no functional issue with the use of the sub-tables or select values generated therefrom, as processor 102 can recover from the effects of the false positives. Note that, although false positives may occur, the sub-tables are not expected to give a false negative.

Figure 6:
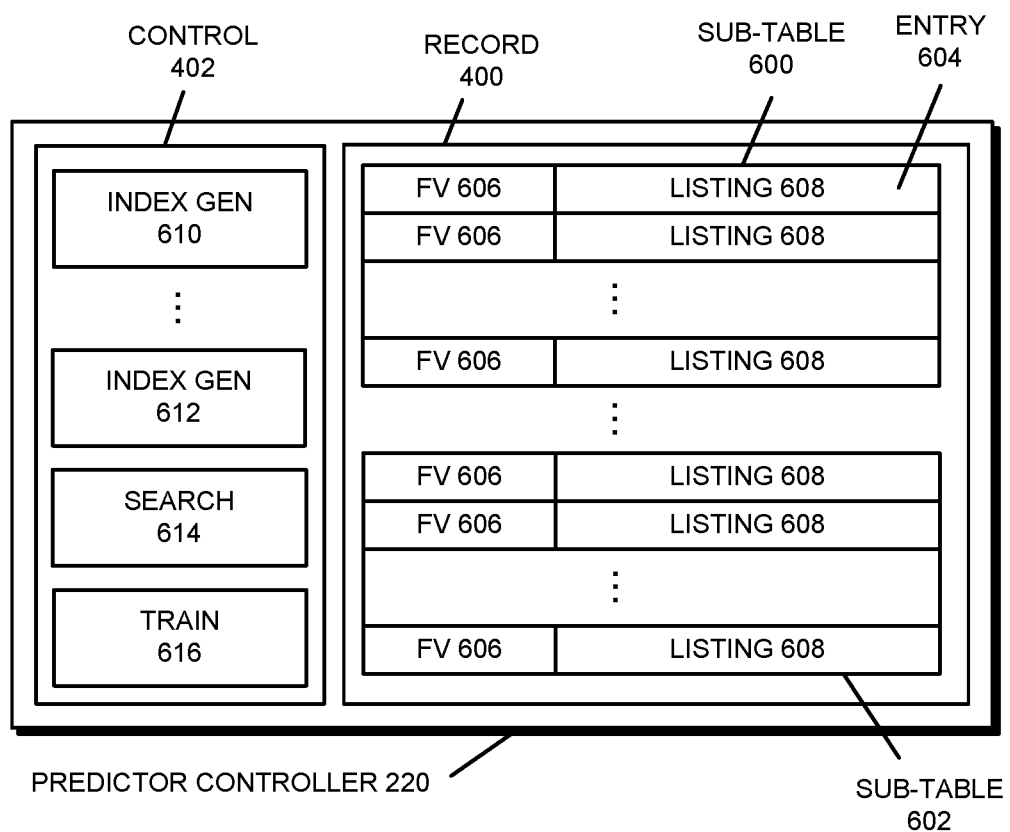
FIG. 6 presents a block diagram illustrating sub-tables in a record in accordance with some embodiments.

FIG. 6 presents a block diagram illustrating sub-tables 600 and 602 in record 400 in accordance with some embodiments. As can be seen in FIG. 6, sub-tables 600-602 include a number of entries 604 (only one of which is labeled for clarity), each entry usable for storing a frequency value (FV) 606 and a listing 608. Frequency values 606 are values (e.g., numerical values, etc.) that indicate the number of CTIs that have indexed into that entry 604. For example, in some embodiments, each frequency value is a three-bit saturating counter. Listings 608 are values (e.g., sequences of bits, strings, numerical values, etc.) that indicate the prediction functional blocks from which a branch predictor (e.g., branch predictor 300) previously selected predictions for the CTIs that index into that entry 604. For example, in some embodiments, each listing 608 includes a sequence of bits with a single bit to be used for storing an indicator for each available prediction functional block in the branch predictor. In these embodiments, if there are five prediction functional blocks in the branch predictor, there are five bits in each listing 608, with each bit used for indicating a specified one of the prediction functional blocks.

Control 402 in FIG. 6 includes index generators (GEN) 610-612, which are functional blocks that include circuitry for generating indexes from identifiers associated with CTIs. Each of index generators 610-612 is associated with a single sub-table and includes circuitry (e.g., logic gates, complex logic, etc.) for generating indices for the single sub-table using a respective hash function for that sub-table. For example, in some embodiments, index generator 610 generates indices for sub-table 600 and index generator 612 generates indices for sub-table 602. In some embodiments, the hash function used for some or all of the sub-tables, and thus the index-generating circuitry in each of index generators 610-612, is different—and an identifier associated with a given CTI may therefore index into entries 602 in different locations in sub-tables 600-602. In some embodiments, the indices generated by index generators 610-612 are not exclusive—and thus collisions may occur (i.e., the same indices into a given sub-table may be generated based on the identifiers for two or more CTIs). Although this is true, there is no functional issue with the use of the indices or the predictor select values generated therefrom, as processor 102 can recover from mispredictions caused by the use of incorrect predictor select values caused by index collisions.

Control 402 in FIG. 6 also includes search 614, which is a functional block that includes circuitry for searching sub-tables 600-602 in record 400 for information for CTIs. When searching for information for given CTI, search 614 receives indices from each of index generators 610-612 and checks frequency values 606 in entries 604 indicated by the indices. When a frequency value 606 in at least one of the entries 604 is zero, search 614 determines that the given CTI has not yet been encountered. In this case, record 400 does not include information for the given CTI and search 614 returns a miss indicator. On the other hand, when the frequency values 606 in each of the entries indexed into for the given CTI is non-zero, search 614 determines whether the frequency value in each of the entries is greater than a threshold value. If the frequency value 606 in at least one of the entries 604 is less than the threshold value, the information about the given CTI in the entries is not sufficiently trustworthy to be used for controlling the prediction functional blocks to be used by the branch predictor for generating predictions—and search 614 returns a miss indicator (or at least does not return an identifier for an entry). In other words, in this case, the branch predictor has not made enough predictions for the given CTI to enable confident predictions of the prediction functional block(s) from which the branch predictor is likely to select a prediction based on entries 604 in record 400. If the frequency value 606 in all of the entries 604 is greater than the threshold value, search 614 returns an identifier for the entry.

Control 402 in FIG. 6 additionally includes train 616, which is a functional block that includes circuitry for training record 400. For "training" record 400, train 616 performs operations for maintaining information in entries 604 in sub-tables 600-602. In other words, train 616 performs operations for keeping information in the entries 604 substantially updated and current during operation of processor 102. For example, in some embodiments, train 616 receives, from index generators 610-612, respective indexes into sub-tables 600-602 associated with a given CTI and, from controller 324, a prediction functional block identifier 406. Train 616 then increases (e.g., increments) the frequency value 606 and updates the listing 608 in the entry 604 in each sub-table 600-602 indicated by the respective index to indicate that the branch predictor selected a prediction from the prediction functional block identified in prediction functional block identifier 406. For example, in an embodiment where each listing 608 includes a sequence of bits having a single bit for each prediction functional block, train 616 can switch a bit for a given prediction functional block from 0 to 1 to indicate that the prediction was selected from that prediction functional block. Note, however, that train 616 leaves listings 608 unchanged in the event that the indicator for a given prediction functional block is already set.

In some embodiments, upon the occurrence of one or more reset events, train 616 resets or clears some or all of the entries 604 in sub-tables 600-602, thereby removing information about a CTI from each reset or cleared entry 604. For example, in some embodiments, train 616 resets all of the entries periodically (e.g., every F seconds, following a hardware/software context switch, etc.). As another example, in some embodiments, train 616 keeps track of the ages of the entries 604, i.e., a time since a last update, and resets each entry 604 when that entry 604 exceeds a given age. Generally, in these embodiments, train 616 performs operations for removing, from entries 604, information about CTIs that is determined to be stale—and thus less likely to be correct Although predictor controller 220, control 402, and record 400 are described as including particular functional blocks and elements, and the functional blocks and elements are described as performing respective operations, in some embodiments, different functional blocks and/or elements are present in some or all of predictor controller 220, control 402, and/or record 400 and/or the functional blocks and/or elements perform different operations. For example, in some embodiments, there are a different number of sub-tables (as shown by the ellipsis). As another example, in some embodiments, there are a different number of index generators (e.g., a single index generator that generates the indices for all of the sub-tables, etc.). Generally, in the described embodiments, predictor controller 220, control 402, and record 400 include sufficient functional blocks and elements to perform the operations herein described.

Figure 7:
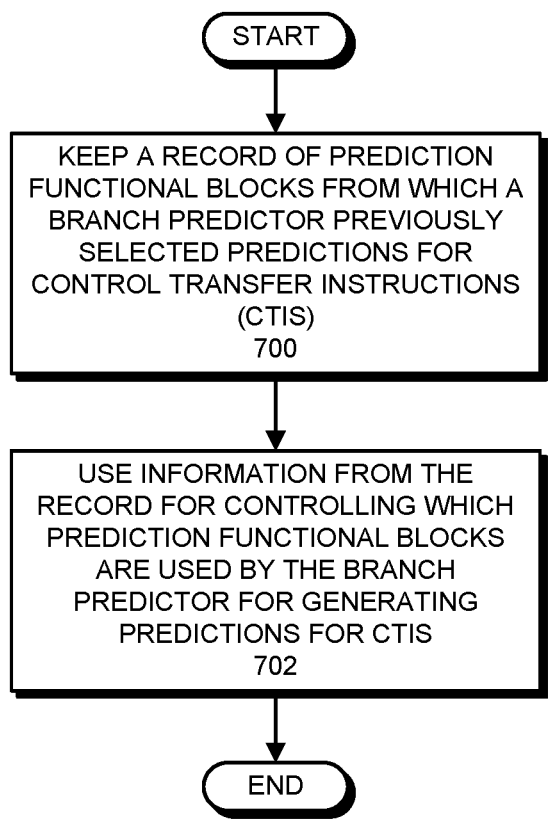
FIG. 7 presents a flowchart illustrating a process for controlling prediction functional blocks used by a branch predictor for generating predictions for CTIs in accordance with some embodiments.

Process for Controlling Prediction Functional Blocks used by a Branch Predictor for Generating Predictions for Control Transfer Instructions In the described embodiments, a predictor controller (e.g., predictor controller 220) performs operations for controlling the prediction functional blocks used by a branch predictor (e.g., branch predictor 300) for generating predictions for CTIs. FIG. 7 presents a flowchart illustrating a process for controlling prediction functional blocks used by a branch predictor for generating predictions for CTIs in accordance with some embodiments. Note that the operations shown in FIG. 7 are presented as a general example of operations performed by some embodiments. The operations performed by other embodiments include different operations, operations that are performed in a different order, and/or operations that are performed by different entities or functional blocks.

The operations in FIG. 7 start when the predictor controller keeps a record (e.g., record 400) of prediction functional blocks from which the branch predictor previously selected predictions for CTIs (step 700). For this operation, the predictor controller, based on information about prediction functional blocks from which predictions were selected for CTIs by the branch predictor (e.g., prediction functional block identifier 406), adds information about the CTI to the record or updates existing information in the record. In other words, the predictor controller maintains, in the record, listings that identify prediction functional blocks from which the branch predictor previously selected predictions for CTIs.

The predictor controller then uses information from the record for controlling which prediction functional blocks are used by the branch predictor for generating predictions for CTIs (step 702). For this operation, the predictor controller acquires information about prediction functional blocks from which predictions were previously selected for a given CTI (for this example, the record is assumed to have information for the given CTI). The predictor controller then generates a predictor select value that identifies the prediction functional blocks from which predictions were previously selected (e.g., predictor select value 408) and communicates the predictor select value to the branch predictor. The branch predictor next generates predictions for the given CTI using only prediction functional blocks identified in the predictor select value.

Figure 8:
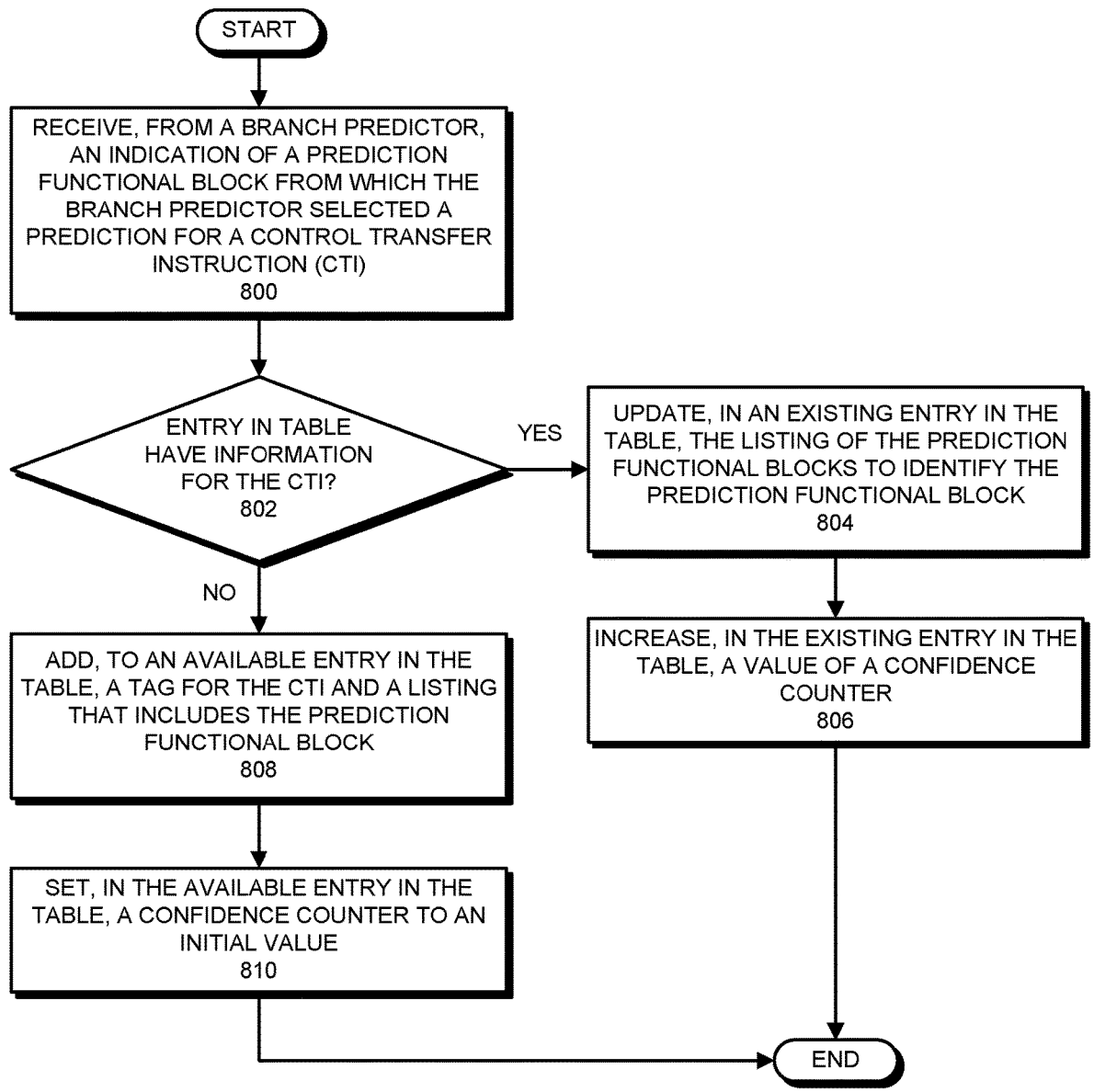
FIG. 8 presents a flowchart illustrating a process for updating information in a tag-indexed table in a predictor controller in accordance with some embodiments.

Process for Updating Information in a Tag-Indexed Table in a Predictor Controller In some embodiments, a predictor controller (e.g., predictor controller 220) uses a tag-indexed table as the record (e.g., record 400) for storing information about prediction functional blocks from which a branch predictor (e.g., branch predictor 300) previously selected predictions for CTIs. FIG. 8 presents a flowchart illustrating a process for updating information in a tag-indexed table in a predictor controller in accordance with some embodiments. Note that the operations shown in FIG. 8 are presented as a general example of operations performed by some embodiments. The operations performed by other embodiments include different operations, operations that are performed in a different order, and/or operations that are performed by different entities or functional blocks.

The operations in FIG. 8 start when the predictor controller receives, from a branch predictor (e.g., branch predictor 300), an indication of a prediction functional block (e.g., base predictor 302, tagged predictor 304, etc.) from which the branch predictor selected a prediction for a CTI (step 800). For this operation, the branch predictor generates, using some or all of a set of prediction functional blocks in the branch predictor, a prediction for the CTI. The branch predictor then selects, in accordance with a selection policy, the prediction from one of the prediction functional blocks to be used as the prediction for the CTI—i.e., to be the prediction output of the branch predictor (e.g., prediction output 322) that is used by next PC 216 and/or other functional blocks for determining which prediction windows are to be fetched following a prediction window in which the CTI is included. The branch controller also communicates, to the predictor controller, a prediction functional block identifier (e.g., prediction functional block identifier 328) that identifies the prediction functional block.

The predictor controller then searches the table to determine whether an entry (e.g., entry 500) in the table has information for the CTI (step 802). In other words, the predictor controller searches the table for an existing entry in which is stored information about the CTI. For this operation, the predictor controller uses an identifier for the CTI (e.g., a program counter of a prediction window in which the CTI is included) to generate a tag for the CTI. For example, in some embodiments, the predictor controller generates the tag for the CTI using a hash function for the table with the identifier for the CTI (and possibly one or more other values) as the input. The predictor controller then searches the table for an existing entry in which is stored a tag that matches the tag for the CTI.

When an existing entry in the table has information for the CTI (step 802), the predictor controller updates, in the existing entry, the listing of the prediction functional blocks to include an indication of the prediction functional block (step 804). For this operation, when the listing already includes an indication of the prediction functional block, such as when the branch predictor previously selected a prediction from the prediction functional block, the predictor controller leaves the listing unchanged. Otherwise, when the listing does not include an indication of the prediction functional block, such as when the branch predictor has selected a prediction from the prediction functional block for the first time, the predictor controller changes the listing to include an indication of the prediction functional block. For example, in an embodiment where the listing includes a set of bits that has a single bit for each prediction functional block, the predictor controller can change a value of a bit for the prediction functional block from 0 to 1 (or vice versa), thereby including the indication of the prediction functional block in the listing. The predictor controller also increases, in the existing entry in the table, a value of a confidence counter (e.g., confidence counter 506) (step 806).

When no entry in the table has information for the CTI (step 802), the predictor controller adds, to an available entry in the table, a tag for the CTI and a listing that includes the prediction functional block (step 808). For this operation, the predictor controller stores the above-described tag for the CTI and a newly generated listing that includes indication of the prediction functional block in the available entry. For example, in an embodiment where the listing includes a set of bits that has a single bit for each prediction functional block, the predictor controller generates a listing in which a value of a bit for the prediction functional block is set to 1 (or 0), thereby including the indication of the prediction functional block in the listing. The predictor controller then stores the listing in the available entry. The predictor controller also sets, in the available entry in the table, a confidence counter (e.g., confidence counter 506) to an initial value (step 810). For example, the initial value for the confidence counter may be 0 or 1. As part of this operation, in embodiments in which the table is organized associatively, the predictor controller performs operations for finding the available entry.

Figure 9:
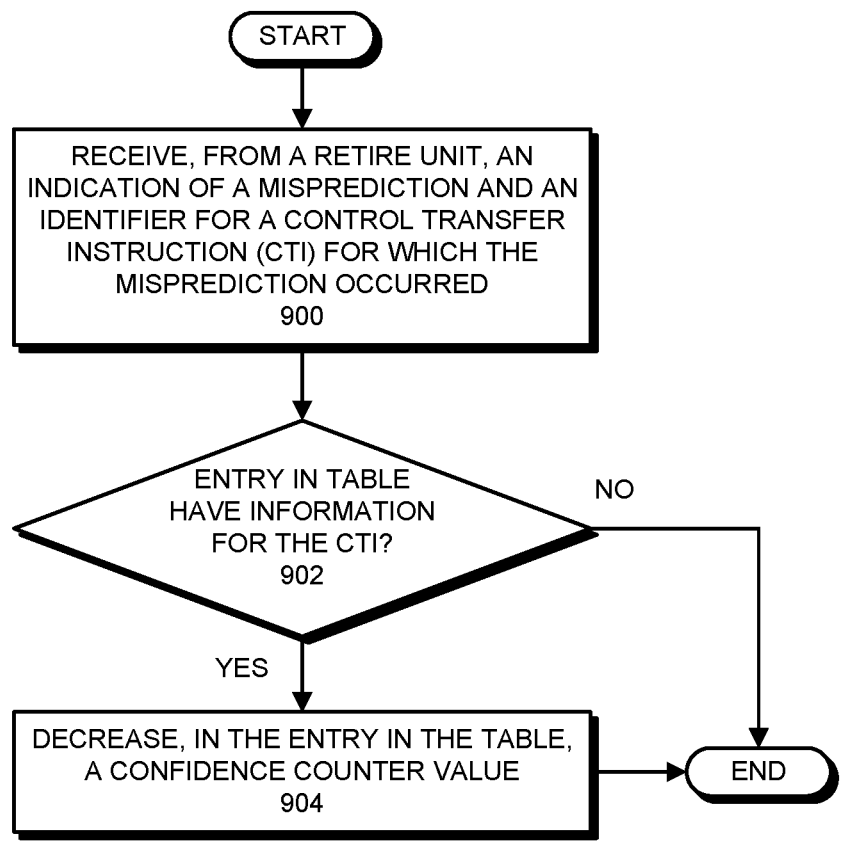
FIG. 9 presents a flowchart illustrating a process for updating confidence counters in a tag-indexed table in a predictor controller in accordance with some embodiments.

Process for Updating Confidence Counters in a Tag-Indexed Table in a Predictor Controller In some embodiments, a predictor controller (e.g., predictor controller 220) updates confidence counter values (e.g., confidence counters 506) in entries in a tag-indexed table upon determining that mispredictions were made for CTIs for which the entries store information. FIG. 9 presents a flowchart illustrating a process for updating confidence counters in a tag-indexed table in a predictor controller in accordance with some embodiments. Note that the operations shown in FIG. 9 are presented as a general example of operations performed by some embodiments. The operations performed by other embodiments include different operations, operations that are performed in a different order, and/or operations that are performed by different entities or functional blocks.

The operations in FIG. 9 start when the predictor controller receives, from a retire unit (e.g., retire unit 226) (or a branch prediction unit or another functional block), an indication of a misprediction and an identifier associated with a CTI for which the misprediction occurred (step 900). For example, the predictor controller may receive, as the identifier for the CTI, a program counter for a prediction window in which the CTI is included. For this operation, the retire unit receives, along with the result of a CTI (e.g., a direction resolution of the CTI, etc.) information about the prediction made by the branch predictor (e.g., branch predictor 300) for the CTI. The retire unit then determines that the prediction does not match the result of the CTI—and thus the branch predictor mispredicted the CTI. The retire unit next communicates the indication of the misprediction and the identifier associated with the CTI to the predictor controller.

The predictor controller then searches the table to determine whether an entry (e.g., entry 500) in the table has information for the CTI (step 902). In other words, the predictor controller searches the table for an existing entry in which is stored information about the CTI. For this operation, the predictor controller uses the identifier for the CTI to generate a tag for the CTI. For example, in some embodiments, the predictor controller generates the tag for the CTI using a hash function for the table with the identifier for the CTI (and possibly one or more other values) as the input. The predictor controller then searches the table for an existing entry in which is stored a tag that matches the tag for the CTI.

When the table does not include an entry for the CTI (e.g., when information for the CTI in an entry in the table was previously overwritten) (step 902), the process ends. Otherwise, when an entry in the table has information for the CTI (step 902), the predictor controller reduces, in the entry, a value of a confidence counter (e.g., confidence counter 506) (step 904). In other words, along with the above described setting and increasing of the confidence counter as predictions are made for CTIs (i.e., in steps 806 and 810), the predictor controller reduces the confidence counter (to a value no lower than zero or another initial value) when the predictions turn out to be incorrect. In this way, the entry in the table stores a confidence count approximating the probability that a correct prediction was made by the branch predictor for a respective CTI—and thus can reflect the "confidence" that the predictor controller can have in the information in that entry.

Figure 10:
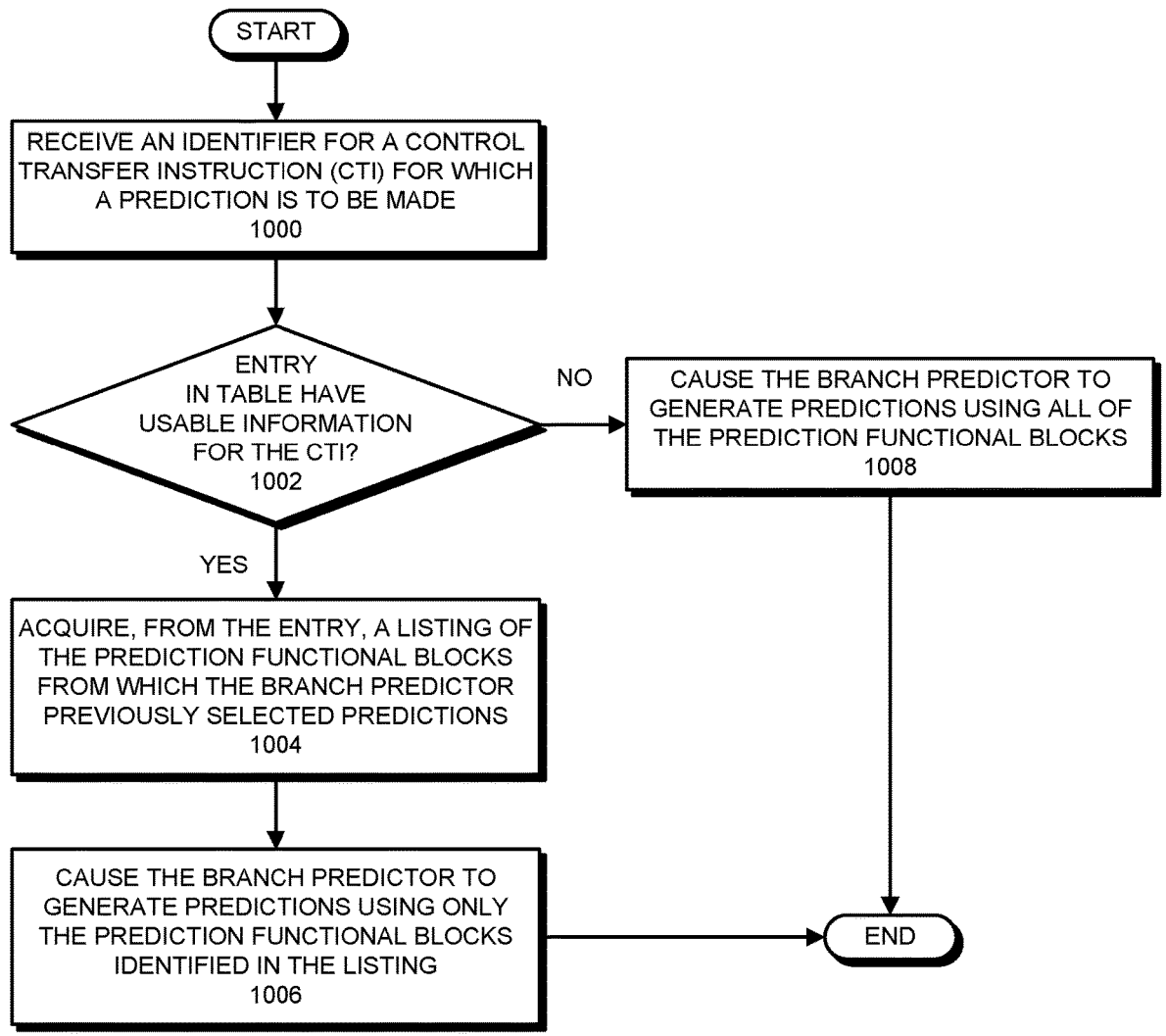
FIG. 10 presents a flowchart illustrating a process for using information from a tag-indexed table to control prediction functional blocks that are used by a branch predictor for generating predictions for CTIs in accordance with some embodiments.

Process for Using Information from a Tag-Indexed Table in a Predictor Controller In some embodiments, a predictor controller (e.g., predictor controller 220) uses information from a tag-indexed table to control which prediction functional blocks (e.g., base predictor 302, tagged predictor 304, etc.) are used by a branch predictor (e.g., branch predictor 300) for generating predictions for CTIs. FIG. 10 presents a flowchart illustrating a process for using information from a tag-indexed table to control prediction functional blocks that are used by a branch predictor for generating predictions for CTIs in accordance with some embodiments. Note that the operations shown in FIG. 10 are presented as a general example of operations performed by some embodiments. The operations performed by other embodiments include different operations, operations that are performed in a different order, and/or operations that are performed by different entities or functional blocks.

The operations in FIG. 10 start when the predictor controller receives an identifier for a CTI for which a prediction is to be made by a branch predictor (step 1000). For this operation, the predictor controller receives an identifier for the CTI such as a program counter for a prediction window in which the CTI is included, an address for the CTI, and/or another identifier for the CTI. The predictor controller receives the identifier from the CTI from a functional block such as next PC 216, branch prediction unit 218, or another functional block.

The predictor controller then searches the table to determine whether an entry (e.g., entry 500) in the table has usable information for the CTI (step 1002). In other words, the predictor controller searches the table for an existing entry in which is stored information about the CTI that is permitted to be used for controlling the prediction functional blocks used by the branch predictor. For this operation, the predictor controller uses the identifier for the CTI to generate a tag for the CTI. For example, in some embodiments, the predictor controller generates the tag for the CTI using a hash function for the table with the identifier for the CTI (and possibly one or more other values) as the input. The predictor controller then searches the table for an existing entry in which is stored a tag that matches the tag for the CTI. If an existing entry with a tag that matches the tag for the CTI is found, the predictor controller checks the confidence counter for the existing entry. When the confidence counter is below a threshold value, although there is an existing entry with a matching tag, the information in the entry is considered insufficiently reliable and is not permitted to be used for controlling the prediction functional blocks used by the branch predictor. In other words, the branch predictor has not yet made enough correct predictions using the prediction functional blocks in the listing in the existing entry and the information in the existing entry is therefore not permitted to be used. Otherwise, when the confidence counter is at or above a threshold value, the information in the entry is considered reliable and is therefore permitted to be used for controlling the prediction functional blocks used by the branch predictor.

When an entry (e.g., entry 500) in the table has usable information for the CTI (step 1002), the predictor controller acquires, from the entry, a listing (e.g., listing 504) of the prediction functional blocks from which the branch predictor previously selected predictions (step 1004). For this operation, the predictor controller reads the listing from the entry. For example, in an embodiment where the listing includes a set of bits with a single bit for each prediction functional block, the predictor controller can read the set of bits from the listing.

The predictor controller then causes the branch predictor to generate predictions using only the prediction functional blocks identified in the listing (step 1006). For this operation, the predictor controller generates, using the listing from the entry, a predictor select value (e.g., predictor select value 408). The predictor controller then communicates the predictor select value to the branch predictor. For example, the predictor select value can be a multi-bit value with a different bit for each prediction functional block that the predictor controller communicates, using a serial or parallel signal route, to the branch predictor. A controller in the branch predictor (e.g., controller 324) receives the predictor select value and uses only the prediction functional blocks that are identified in predictor select value to generate predictions. In other words, the controller disables or otherwise prevents prediction functional blocks that are not identified in the predictor select value from generating predictions. These prediction functional blocks do not generate predictions and so the branch predictor can only select from among prediction(s) that were generated by the other (not disabled/prevented) prediction functional blocks for the prediction to be output from the branch predictor.

In contrast, when no entry in the table has usable information for the CTI (step 1002), the predictor controller causes the branch predictor to generate predictions using all of (or a specified group of) the prediction functional blocks (step 1008). In this way, the predictor controller uses a "default" group of prediction functional blocks (again, either all of or a specified group of prediction functional blocks) when the table does not provide a listing of prediction functional blocks to be used.

Process for Updating Information in Sub-Tables in a Predictor Controller

Figure 11:
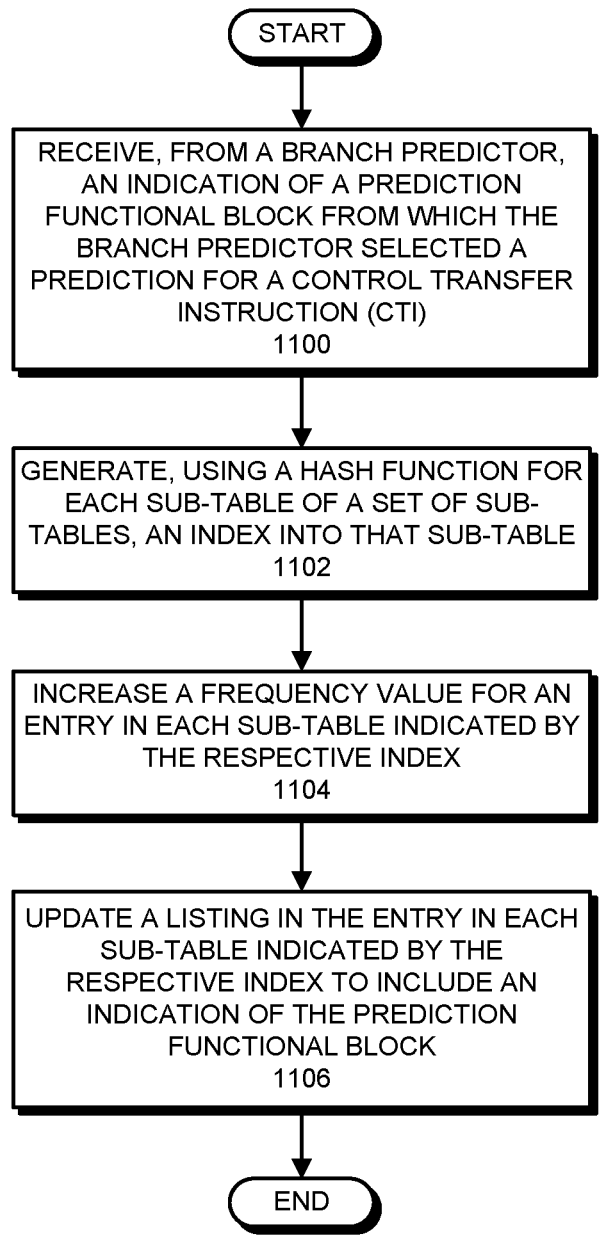
FIG. 11 presents a flowchart illustrating a process for updating information in sub-tables in a predictor controller in accordance with some embodiments.

In some embodiments, a predictor controller (e.g., predictor controller 220) uses a set of sub-tables as the record for storing information about prediction functional blocks from which a branch predictor previously selected predictions for CTIs. FIG. 11 presents a flowchart illustrating a process for updating information in sub-tables in a predictor controller in accordance with some embodiments. Note that the operations shown in FIG. 11 are presented as a general example of operations performed by some embodiments. The operations performed by other embodiments include different operations, operations that are performed in a different order, and/or operations that are performed by different entities or functional blocks.

The operations in FIG. 11 start when the predictor controller receives, from a branch predictor (e.g., branch predictor 300), an indication of a prediction functional block (e.g., base predictor 302, tagged predictor 304, etc.) from which the branch predictor selected a prediction for a CTI (step 1100). For this operation, the branch predictor generates, using some or all of a set of prediction functional blocks in the branch predictor, a prediction for the CTI. The branch predictor then selects, in accordance with a selection policy, the prediction from one of the prediction functional blocks to be used as the prediction for the CTI—i.e., to be the prediction output of the branch predictor (e.g., prediction output 322) that is used by next PC 216 and/or other functional blocks for determining which prediction windows are to be fetched following a prediction window in which the CTI is included. The branch controller also communicates, to the predictor controller, a prediction functional block identifier (e.g., prediction functional block identifier 328) that identifies the prediction functional block.

The predictor controller then generates, using a hash function for each sub-table in set of sub-tables in the predictor controller (e.g., sub-tables 600-602), an index into that sub-table (step 1102). For this operation, index generators (e.g., index generators 610-612) generate, using corresponding hash function circuitry, indices into the respective sub-tables.

The predictor controller (e.g., train 616) then increases a frequency value for an entry (e.g., entry 604) in each sub-table indicated by the respective index (step 1104). For this operation, the predictor controller increases the frequency value (e.g., frequency value 606) in the entry by incrementing the frequency value or otherwise modifying the frequency value to reflect that the prediction from the prediction functional block was selected by the branch predictor. The predictor controller also updates a listing (e.g., listing 608) in the entry in each sub-table indicated by the respective index to include an indication of the prediction functional block (step 1106). For this operation, when a listing already includes an indication of the prediction functional block, such as when the branch predictor previously selected a prediction from the prediction functional block, the predictor controller leaves the listing unchanged. Otherwise, when the listing does not include an indication of the prediction functional block, such as when the branch predictor has selected a prediction from the prediction functional block for the first time, the predictor controller changes the listing to include an indication of the prediction functional block. For example, in an embodiment where the listing includes a set of bits that has a single bit for each prediction functional block, the predictor controller can change a value of a bit for the prediction functional block from 0 to 1 (or vice versa), thereby including the indication of the prediction functional block in the listing.

Process for Updating Frequency Values in Sub-Tables in a Predictor Controller

Figure 12:
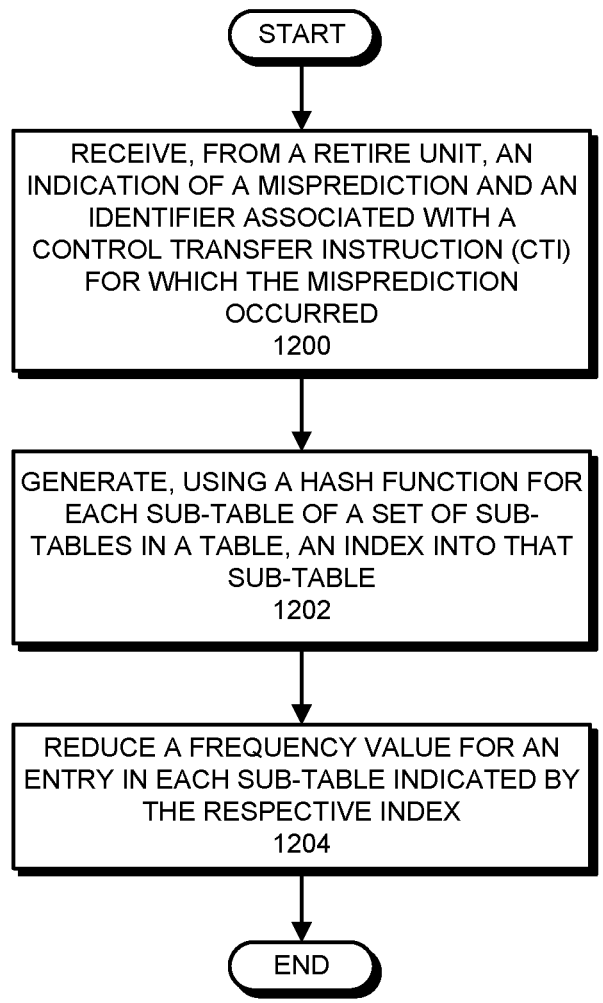
FIG. 12 presents a flowchart illustrating a process for updating frequency values in sub-tables in a predictor controller in accordance with some embodiments.

In some embodiments, a predictor controller updates frequency values (e.g., frequency values 606) in entries in sub-tables (e.g., sub-tables 600-602) upon determining that mispredictions were made for CTIs for which the entries store information. FIG. 12 presents a flowchart illustrating a process for updating frequency values in sub-tables in a predictor controller in accordance with some embodiments.

Note that the operations shown in FIG. 12 are presented as a general example of operations performed by some embodiments. The operations performed by other embodiments include different operations, operations that are performed in a different order, and/or operations that are performed by different entities or functional blocks.

The operations in FIG. 12 start when the predictor controller receives, from a retire unit (e.g., retire unit 226) (or a branch prediction unit or another functional block), an indication of a misprediction and an identifier associated with a CTI for which the misprediction occurred (step 1200). For example, the predictor controller may receive, as the identifier for the CTI, a program counter for a prediction window in which the CTI is included. For this operation, the retire unit receives, along with the result of a CTI (e.g., a direction resolution of the CTI, etc.) information about the prediction made by the branch predictor (e.g., branch predictor 300) for the CTI. The retire unit then determines that the prediction does not match the result of the CTI—and thus the branch predictor mispredicted the CTI. The retire unit next communicates the indication of the misprediction and the identifier associated with the CTI to the predictor controller.

The predictor controller then generates, using a hash function for each sub-table in set of sub-tables in the predictor controller (e.g., sub-tables 600-602), an index into that sub-table from the identifier for the CTI (step 1202). For this operation, index generators (e.g., index generators 610-612) generate, using corresponding hash function circuitry, indices into the respective sub-tables.

The predictor controller then reduces a frequency value for an entry in each sub-table indicated by the respective index (step 1204). In other words, along with the above described increasing of the frequency as predictions are made for CTIs (i.e., in step 1104), the predictor controller reduces the frequency values (to a value no lower than zero or another initial value) when the predictions turn out to be incorrect. In this way, the entries in the sub-tables store a frequency value approximating the probability that a correct prediction was made by the branch predictor for CTIs—and thus can reflect the "confidence" that the predictor controller can have in the information in those entries.

Process for Using Information from Sub-Tables in a Predictor Controller

Figure 13:
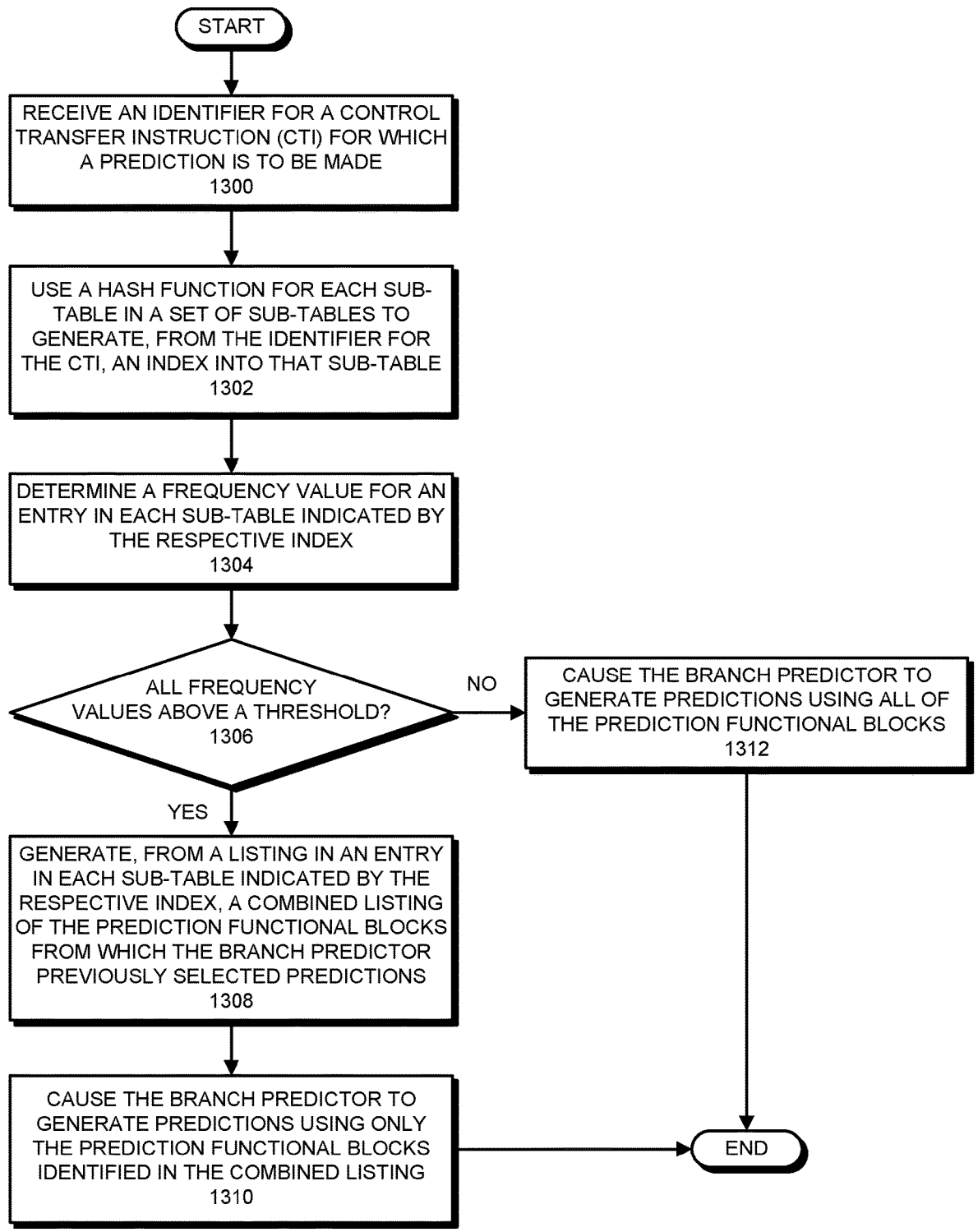
FIG. 13 presents a flowchart illustrating a process for using information from sub-tables to control prediction functional blocks that are used by a branch predictor for generating predictions for CTIs in accordance with some embodiments.

In some embodiments, a predictor controller (e.g., predictor controller 220) uses information from sub-tables to control which prediction functional blocks (e.g., base predictor 302, tagged predictor 304, etc.) are used by a branch predictor (e.g., branch predictor 300) for generating predictions for CTIs. FIG. 13 presents a flowchart illustrating a process for using information from sub-tables to control prediction functional blocks that are used by a branch predictor for generating predictions for CTIs in accordance with some embodiments. Note that the operations shown in FIG. 13 are presented as a general example of operations performed by some embodiments. The operations performed by other embodiments include different operations, operations that are performed in a different order, and/or operations that are performed by different entities or functional blocks.

The operations in FIG. 13 start when the predictor controller receives an identifier for a CTI for which a prediction is to be made by a branch predictor (step 1300). For this operation, the predictor controller receives an identifier for the CTI such as a program counter for a prediction window in which the CTI is included, an address for the CTI, and/or another identifier for the CTI. The predictor controller receives the identifier from the CTI from a functional block such as next PC 216, branch prediction unit 218, or another functional block.

The predictor controller then generates, using a hash function for each sub-table in set of sub-tables in the predictor controller (e.g., sub-tables 600-602), an index into that sub-table from the identifier for the CTI (step 1302). For this operation, index generators (e.g., index generators 610-612) generate, using corresponding hash function circuitry, indices into the respective sub-tables.

The predictor controller next determines a frequency value (e.g., frequency value 606) for an entry (e.g., entry 604) in each sub-table indicated by the respective index (step 1304). For this operation, the predictor controller reads, from the entries in the sub-tables indicated by the indices, the frequency values.

When all of the frequency values are above a threshold (step 1306), the predictor controller generates, from a listing (e.g., listing 608) in an entry in each sub-table indicated by the respective index, a combined listing of the prediction functional blocks from which the branch predictor previously selected predictions (step 1308). The predictor controller then causes the branch predictor to generate predictions for the CTI using only the prediction functional blocks identified in the combined listing (step 1310). For this operation, the predictor controller generates, using the combined listing, a predictor select value (e.g., predictor select value 408). The predictor controller then communicates the predictor select value to the branch predictor. For example, the predictor select value can be a multi-bit value with a different bit for each prediction functional block that the predictor controller communicates, using a serial or parallel signal route, to the branch predictor. A controller in the branch predictor (e.g., controller 324) receives the predictor select value and uses only the prediction functional blocks that are identified in predictor select value to generate predictions. In other words, the controller disables or otherwise prevents prediction functional blocks that are not identified in the predictor select value from generating predictions. These prediction functional blocks do not generate predictions and so the branch predictor can only select from among prediction(s) that were generated by the other (not disabled/prevented) prediction functional blocks for the prediction to be output from the branch predictor.

When one or more of the frequency values are below the threshold (step 1306), the predictor controller causes the branch predictor to generate predictions for the CTI using all (or a specified group of) the prediction functional blocks (step 1312). In this case, the information in at least one of the entries cannot yet be used for controlling which prediction functional blocks are used for generating predictions by the branch predictor because an insufficient number of correct predictions have been made by the branch predictor for the CTI—and thus the information in that entry (or those entries) is not considered trustworthy. In this way, the predictor controller uses a "default" group of prediction functional blocks (again, either all of or a specified group of prediction functional blocks) when the sub-tables do not provide a listing of prediction functional blocks to be used.

In some embodiments, at least one electronic device (e.g., electronic device 100) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers (e.g., predictor controller 220, etc.), and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a processor;
a branch predictor in the processor, the branch predictor including multiple prediction functional blocks, each prediction functional block configured for generating predictions for control transfer instructions (CTIs) based on respective prediction information; and
a predictor controller in the processor that stores a record of prediction functional blocks from which the branch predictor previously selected predictions for CTIs, the predictor controller configured to use information from the record for controlling which prediction functional blocks are used by the branch predictor for generating predictions for CTIs, the controlling including using only prediction functional blocks from which the record indicates the branch predictor previously selected predictions for generating predictions for CTIs.

2. The electronic device of claim 1, wherein the record includes a table having multiple entries, each entry configured for storing tags associated with CTIs and listings of prediction functional blocks from which the branch predictor previously selected predictions for CTIs associated with the tags.

3. The electronic device of claim 2, wherein the predictor controller is configured to:
train the table by:
receiving, from the branch predictor, an indication of a given prediction functional block from which the branch predictor selected the prediction for a given CTI;
when no entry in the table includes information for the given CTI, adding, to an available entry in the table, a tag associated with the given CTI and a listing of the prediction functional blocks that includes an indication of the given prediction functional block; and
when an existing entry in the table includes information for the given CTI, updating, in the existing entry, the listing of the prediction functional blocks to include an indication of the given prediction functional block.

4. The electronic device of claim 3, wherein:
each entry in the table is configured for storing a confidence counter; and
when training the table, the predictor controller is configured to:
when adding the tag and the listing of the prediction functional blocks to the available entry, setting a value of a confidence counter for the available entry to an initial value; and
when updating the listing of the prediction functional blocks for the existing entry, increasing the value of the confidence counter for that entry.

5. The electronic device of claim 4, wherein, when training the table, the predictor controller is configured to:
receive a misprediction signal and an identifier associated with a mispredicted CTI, the misprediction signal indicating that a prediction for the mispredicted CTI that was previously provided by the branch predictor was incorrect; and
when an entry in the table includes information for the mispredicted CTI, reducing the value of the confidence counter for that entry in the table.

6. The electronic device of claim 2, wherein, when using the information from the record, the predictor controller is configured to:
when a prediction is to be provided by the branch predictor for a given CTI, search the table for an existing entry in which is stored an existing tag that matches a tag associated with the given CTI;
when a useable existing entry is found for which the existing tag matches the tag associated with the given CTI, acquire, from the existing entry, the listing of the prediction functional blocks from which the branch predictor previously selected predictions for the given CTI; and
cause the branch predictor to generate predictions for the given CTI using only the prediction functional blocks identified in the listing, wherein the branch predictor selects the prediction to be used for the given CTI from among the generated predictions.

7. The electronic device of claim 6, wherein the predictor controller is configured to:
when no useable existing entry is found, cause the branch predictor to generate predictions for the given CTI using all of the prediction functional blocks, wherein the branch predictor selects the prediction to be used for the given CTI from among the generated predictions.

8. The electronic device of claim 6, wherein searching the table for the existing entry includes:
upon finding an existing entry in the table in which is stored the existing tag that matches the tag associated with the given CTI, determining that the existing entry is useable only when a value of a confidence counter for the existing entry exceeds a threshold value.

9. The electronic device of claim 2, wherein the table is organized as set associative.

10. The electronic device of claim 2, wherein some or all of the entries in the table include respective circular buffers with multiple buffer elements, each buffer element configured for storing a listing of a prediction functional block that generated a prediction that was previously used by the branch predictor for a CTI associated with the tag for that entry.

11. The electronic device of claim 1, wherein the record includes multiple sub-tables, each sub-table being accessed by the predictor controller using a respective hash function, and each sub-table configured for storing frequency values and listings of prediction functional blocks from which the branch predictor previously selected predictions for CTIs.

12. The electronic device of claim 11, wherein the predictor controller is configured to:
train the sub-tables by:
receiving, from the branch predictor, an indication of a given prediction functional block from which the branch predictor selected the selected prediction for a given CTI;
generating, using the hash function for each sub-table, an index into that sub-table based on an identifier for the given CTI;
increasing a frequency value for an entry in each sub-table indicated by the respective index; and
updating the listing of the prediction functional blocks for the entry in each sub-table indicated by the respective index to include an indication of the given prediction functional block.

13. The electronic device of claim 12, wherein, when training the sub-tables, the predictor controller is configured to:
receive a misprediction signal and an identifier of a mispredicted CTI, the misprediction signal indicating that a prediction for the mispredicted CTI previously provided by the branch predictor was incorrect;
generate, using the hash function for each sub-table, an index into that sub-table based on the identifier for the mispredicted CTI; and
reduce a frequency value for an entry in each sub-table indicated by the respective index.

14. The electronic device of claim 11, wherein, when using the information from the record, the predictor controller is configured to:
when a prediction is to be provided by the branch predictor for a given CTI, generate, using the hash function for each sub-table, an index into that sub-table based on the identifier for the given CTI;
determine, based on the frequency value for an entry in each sub-table indicated by the respective index, that the listings of prediction functional blocks in those entries are useable;
generate a combined listing from a combination of the listing of prediction functional blocks in the entry in each sub-table indicated by the respective index; and
cause the branch predictor to generate predictions for the given CTI using only the prediction functional blocks identified in the combined listing, wherein the branch predictor selects the selected prediction to be used for the given CTI from among the generated predictions.

15. The electronic device of claim 14, wherein the predictor controller is configured to:
determine, based on the frequency value for an entry in each sub-table indicated by the respective index, that the listings of prediction functional blocks in those entries are not useable; and
cause the branch predictor to generate predictions for the given CTI using all of the prediction functional blocks, wherein the branch predictor selects the selected prediction to be used for the given CTI from among the generated predictions.

16. The electronic device of claim 1, wherein the branch predictor is configured to select, from among predictions generated by the prediction functional blocks for each CTI, a selected prediction to be used for that CTI.

17. A method for making predictions for control transfer instructions (CTIs) in an electronic device that includes a processor; a branch predictor in the processor, the branch predictor including multiple prediction functional blocks, each prediction functional block configured for generating predictions for control transfer instructions (CTIs) based on respective prediction information; and a predictor controller in the processor, the method comprising:

using, by the predictor controller, information from a record of prediction functional blocks from which the branch predictor previously selected predictions for CTIs for controlling which prediction functional blocks are used by the branch predictor for generating predictions for CTIs, the controlling including using only prediction functional blocks from which the record indicates the branch predictor previously selected predictions for generating predictions for CTIs.

18. The method of claim 17, wherein the record includes a table having multiple entries, each entry configured for storing tags associated with CTIs and listings of prediction functional blocks from which the branch predictor previously selected predictions for CTIs associated with the tags.

19. The method of claim 18, further comprising:
training, by the predictor controller, the table by:
receiving, from the branch predictor, an indication of a given prediction functional block from which the branch predictor selected the prediction for a given CTI;
when no entry in the table includes information for the given CTI, adding, to an available entry in the table, a tag associated with the given CTI and a listing of the prediction functional blocks that includes an indication of the given prediction functional block; and
when an existing entry in the table includes information for the given CTI, updating, in the existing entry, the listing of the prediction functional blocks to include an indication of the given prediction functional block.

20. The method of claim 19, wherein each entry in the table is configured for storing a confidence counter and training the table comprises:
when adding the tag and the listing of the prediction functional blocks to the available entry, setting, by the predictor controller, a value of a confidence counter for the available entry to an initial value; and
when updating the listing of the prediction functional blocks for the existing entry, increasing, by the predictor controller, the value of the confidence counter for that entry.

21. The method of claim 20, wherein training the table comprises:
receiving, by the predictor controller, a misprediction signal and an identifier associated with a mispredicted CTI, the misprediction signal indicating that a prediction for the mispredicted CTI that was previously provided by the branch predictor was incorrect; and
when an entry in the table includes information for the mispredicted CTI, reducing, by the predictor controller, the value of the confidence counter for that entry in the table.

22. The method of claim 18, wherein using the information from the record comprises:
when a prediction is to be provided by the branch predictor for a given CTI, searching, by the predictor controller, the table for an existing entry in which is stored an existing tag that matches a tag associated with the given CTI;

when a useable existing entry is found for which the existing tag matches the tag associated with the given CTI, acquiring, by the predictor controller, from the existing entry, the listing of the prediction functional blocks from which the branch predictor previously selected predictions for the given CTI; and
causing, by the predictor controller, the branch predictor to generate predictions for the given CTI using only the prediction functional blocks identified in the listing, wherein the branch predictor selects the prediction to be used for the given CTI from among the generated predictions.

23. The method of claim 22, further comprising:
when no useable existing entry is found, causing, by the predictor controller, the branch predictor to generate predictions for the given CTI using all of the prediction functional blocks, wherein the branch predictor selects the prediction to be used for the given CTI from among the generated predictions.

24. The method of claim 22, wherein searching the table for the existing entry comprises:
upon finding an existing entry in the table in which is stored the existing tag that matches the tag associated with the given CTI, determining, by the predictor controller, that the existing entry is useable only when a value of a confidence counter for the existing entry exceeds a threshold value.

25. The method of claim 17, wherein the record includes multiple sub-tables, each sub-table being accessed by the predictor controller using a respective hash function, and each sub-table configured for storing frequency values and listings of prediction functional blocks from which the branch predictor previously selected predictions for CTIs.

26. The method of claim 25, further comprising:
training, by the predictor controller, the sub-tables by:
receiving, from the branch predictor, an indication of a given prediction functional block from which the branch predictor selected the selected prediction for a given CTI;
generating, using the hash function for each sub-table, an index into that sub-table based on an identifier for the given CTI;
increasing a frequency value for an entry in each sub-table indicated by the respective index; and
updating the listing of the prediction functional blocks for the entry in each sub-table indicated by the respective index to include an indication of the given prediction functional block.

27. The method of claim 26, wherein training the sub-tables comprises:
receiving, by the predictor controller, a misprediction signal and an identifier of a mispredicted CTI, the misprediction signal indicating that a prediction for the mispredicted CTI previously provided by the branch predictor was incorrect;
generating, by the predictor controller, using the hash function for each sub-table, an index into that sub-table based on the identifier for the mispredicted CTI; and
reducing, by the predictor controller, a frequency value for an entry in each sub-table indicated by the respective index.

28. The method of claim 25, wherein using the information from the record comprises:
when a prediction is to be provided by the branch predictor for a given CTI, generating, by the predictor controller, using the hash function for each sub-table, an index into that sub-table based on the identifier for the given CTI;

determining, by the predictor controller, based on the frequency value for an entry in each sub-table indicated by the respective index, that the listings of prediction functional blocks in those entries are useable;

generating, by the predictor controller, a combined listing from a combination of the listing of prediction functional blocks in the entry in each sub-table indicated by the respective index; and causing, by the predictor controller, the branch predictor to generate predictions for the given CTI using only the prediction functional blocks identified in the combined listing, wherein the branch predictor selects the selected prediction to be used for the given CTI from among the generated predictions.

29. The method of claim 28, further comprising:

determining, by the predictor controller, based on the frequency value for an entry in each sub-table indicated by the respective index, that the listings of prediction functional blocks in those entries are not useable; and causing, by the predictor controller, the branch predictor to generate predictions for the given CTI using all of the prediction functional blocks, wherein the branch predictor selects the selected prediction to be used for the given CTI from among the generated predictions.

30. The method of claim 17, wherein the branch predictor is configured to select, from among predictions generated by the prediction functional blocks for each CTI, a selected prediction to be used for that CTI.

* * * * *